United States Patent
Kim et al.

(10) Patent No.: US 9,246,591 B2
(45) Date of Patent: Jan. 26, 2016

(54) OPTICAL CONNECTOR AND STACK MODULE INCLUDING THE SAME

(71) Applicant: Samsung Electronics Co., Ltd., Suwon-si (KR)

(72) Inventors: Bo-Seong Kim, Asan-si (KR); Chang-Hoon Han, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 294 days.

(21) Appl. No.: 13/828,165

(22) Filed: Mar. 14, 2013

(65) Prior Publication Data

US 2013/0294778 A1    Nov. 7, 2013

(30) Foreign Application Priority Data

May 4, 2012 (KR) .................... 10-2012-0047341

(51) Int. Cl.
H04B 10/00 (2013.01)
H04B 10/40 (2013.01)
H04B 10/80 (2013.01)

(52) U.S. Cl.
CPC .............. *H04B 10/40* (2013.01); *H04B 10/801* (2013.01)

(58) Field of Classification Search
CPC ............................ H04B 10/40; H04B 10/801
USPC ........................................... 398/14, 129–132
See application file for complete search history.

(56) References Cited

U.S. PATENT DOCUMENTS

| | | | | |
|---|---|---|---|---|
| 5,787,215 A * | 7/1998 | Kuhara | ............ | H01L 31/12 257/E31.095 |
| 6,330,377 B1 * | 12/2001 | Kosemura | ............ | G02B 6/42 385/14 |
| 6,564,454 B1 * | 5/2003 | Glenn | ............ | H01L 23/49572 257/E21.705 |
| 6,623,178 B1 * | 9/2003 | Sakurai | ............ | G02B 6/4201 385/88 |
| 7,062,117 B2 * | 6/2006 | Uchida | ............ | H05K 1/0274 385/131 |
| 7,263,256 B2 * | 8/2007 | Kim | ............ | G02B 6/43 385/31 |
| 7,680,376 B2 * | 3/2010 | Goebel | ............ | G02B 27/62 385/14 |
| 8,228,679 B2 * | 7/2012 | Shilling | ............ | H01L 23/50 174/260 |
| 2002/0126356 A1 * | 9/2002 | Nakanishi | ............ | G02B 6/4201 398/164 |
| 2002/0196501 A1 * | 12/2002 | Buss | ............ | H04B 10/40 398/139 |
| 2003/0015718 A1 * | 1/2003 | Nakanishi | ............ | G02B 6/4246 257/81 |
| 2003/0152338 A1 * | 8/2003 | Kuhara | ............ | G02B 6/42 385/89 |
| 2003/0152391 A1 * | 8/2003 | Kuhara | ............ | G02B 6/4246 398/164 |
| 2003/0210866 A1 * | 11/2003 | Kuhara | ............ | G02B 6/4246 385/49 |

(Continued)

FOREIGN PATENT DOCUMENTS

| | | |
|---|---|---|
| JP | 2001-185752 | 7/2001 |
| JP | 2007-240833 | 9/2007 |
| KR | 1020080071332 A | 8/2008 |

*Primary Examiner* — Danny Leung
(74) *Attorney, Agent, or Firm* — Myers Bigel Sibley & Sajovec, PA

(57) ABSTRACT

An optical connector for directly transferring data is disclosed. The optical connector includes a first input device connected to a first data source and to which a first input signal is applied, a first light emitting device connected to the first input device and generating a first optical signal corresponding to the first input signal, a first light receiving device positioned close to the first light emitting device in such a configuration that the first optical signal directly reaches the first light receiving device from the first light emitting device, the first light receiving device generating a first output signal corresponding to the first optical signal, and a first output device connected to the first light receiving device and to a second data source to which the first output signal is transferred. Large-sized data may be transferred at high speed and high reliability without light transfer units.

10 Claims, 12 Drawing Sheets

(56) References Cited

U.S. PATENT DOCUMENTS

| | | | |
|---|---|---|---|
| 2003/0223707 A1* | 12/2003 | Nakanishi | G02B 6/3636 385/92 |
| 2005/0224946 A1* | 10/2005 | Dutta | G02B 6/12 002 257/686 |
| 2006/0045417 A1* | 3/2006 | Morita | H04B 10/801 385/31 |
| 2006/0188254 A1* | 8/2006 | Schorpp | H04B 10/1143 398/33 |
| 2008/0008471 A1* | 1/2008 | Dress | G06E 3/006 398/66 |
| 2008/0118202 A1* | 5/2008 | Kato | G02B 3/12 004 385/14 |
| 2009/0097803 A1* | 4/2009 | Yeo | H04B 10/801 385/89 |
| 2010/0119236 A1* | 5/2010 | Uno | H04B 10/808 398/141 |
| 2011/0129225 A1* | 6/2011 | Gostin | H04B 10/801 398/66 |
| 2012/0063785 A1* | 3/2012 | Yagisawa | G02B 6/4246 398/116 |
| 2012/0063787 A1* | 3/2012 | Yagisawa | H04B 10/801 398/164 |
| 2012/0163811 A1* | 6/2012 | Doany et al. | 398/41 |
| 2013/0094864 A1* | 4/2013 | Duis | H04B 10/40 398/139 |
| 2013/0195470 A1* | 8/2013 | Yasuda | B29D 11/00 398/200 |
| 2013/0294778 A1* | 11/2013 | Kim | H04B 10/40 398/135 |
| 2014/0099121 A1* | 4/2014 | Shiraishi | H04B 10/40 398/115 |

\* cited by examiner

OPTICAL CONNECTOR AND STACK MODULE INCLUDING THE SAME

CROSS-REFERENCE TO RELATED APPLICATIONS

This application claims the benefit of Korean Patent Application No. 10-2012-0047341 filed on May 4, 2012 in the Korean Intellectual Property Office, the disclosure of which is incorporated herein in its entirety by reference.

BACKGROUND

1. Field

Example embodiments relate to an optical connector and a stack module including the same, and, more particularly, to an optical module for directly transferring optical signals without any optical transfer unit and a stack module for performing direct data communication with vertically neighboring modules using the optical connector.

2. Description of the Related Art

In an electronic system having integrated circuit devices, electrical connections between chips, between circuit boards and between modules is usually structured by a conductive metal wiring. However, the electrical connections via the metal wiring have caused problems according to the recent technical trends of high speed and high performance of electronic systems. For example, the metal wiring has caused electric-based faults such as electromagnetic interference and high electrical resistance and device faults, such as low operation efficiency and an interrupt for high degrees of integration. Those problems caused by high speed and high performance of recent electronic systems have become more serious as multimedia-based mobile devices, such as smart phones and tablet PCs and digital interactive TV have become more widely spread.

An optical communication device has been widely used for transferring large-sized data at high speed.

A conventional optical communication device includes a light emitting diode electrically connected with a first data source, a photo detector electrically connected with a second data source, and a photo transfer unit interposed between the light emitting diode and the photo detector as an optical path. The optical signal generated from the light emitting diode passes through the photo transfer unit toward the photo detector. The light emitting diode and the photo detector may be located independently from each other due to the photo transfer unit.

The optical transfer unit is usually built in a communication package or an electronic system including an optical module. Otherwise, the optical transfer unit is additionally provided separately from the communication package or the electronic system. Particularly, when the light emitting diode and the photo diode are spaced apart far away from each other and it is difficult to provide the additional optical transfer unit, a flexible optical cable may be used for transferring the optical signal.

However, the conventional optical cable has disadvantages in that it is difficult to align the optical cable with the center of the photo diode and the volume of the optical cable could be a barrier to a small size communication package. In general, the center of the optical cable is aligned with the light source of the photo diode with an extremely small alignment margin on the order of micrometers and, thus, an additional alignment tool is generally used for aligning the optical cable with the photo diode, which increases manufacturing cost of the communication package including the optical cable and the photo diode and of the electronic system including the communication package.

In addition, when the first data source and the second data source are vertically stacked in the optical communication module, the optical transfer unit usually causes various limitations for modification of the optical communication module. The electronic system is usually manufactured by individually assembling a number of semiconductor packages, and, thus, the optical transfer unit cannot be formed into the semiconductor package together in one body. Further, when the flexible optical cable is adopted for the optical transfer unit, the optical cable is installed away from the printed circuit board (PCB) and, thus, the electronic system may not have a small size due to the additional optical cable.

SUMMARY

Example embodiments of the present inventive concept provide an optical connector for directly transferring optical signals without any optical transfer units.

Other example embodiments of the present inventive concept provide a stack module in which at least a pair of component modules is vertically stacked and the component modules are interconnected by the optical connector.

According to some example embodiments, there is provided an optical connector including a first input device connected to a first data source and responsive to a first input signal, a first light emitting device connected to the first input device and generating a first optical signal corresponding to the first input signal, a first light receiving device positioned close to the first light emitting device in such a configuration that the first optical signal may directly reach the first light receiving device from the first light emitting device, the first light receiving device generating a first output signal corresponding to the first optical signal, and a first output device connected to the first light receiving device and to a second data source to which the first output signal may be transferred.

In an example embodiment, the optical connector may further include a first circuit board connected to the first data source and to which the first input device and the first light emitting device may be mounted and a second circuit board connected to the second data source and to which the first output device and the first light receiving device may be mounted.

In an example embodiment, the first input device may be connected to the first light emitting device by a first bonding wire as a first signal transfer package and the first output device may be connected to the first light receiving device by a second bonding wire as a first signal receiving package.

In an example embodiment, the first light emitting device may be stacked on the first input device as a signal transfer stack package and a first light receiving device may be stacked on the first output device as a signal receiving stack package while the first input device may be bonded to the first circuit board by a first solder ball and the first output device may be bonded to the second circuit board by a second solder ball.

In an example embodiment, the first light emitting device may make direct contact with the first data source and the first light receiving device may make direct contact with the second data source, such that the first input device may be positioned in an inside of the first data source and the first output device may be positioned in an inside of the second data source. In such a case, the first light emitting device may include a transfer penetration electrode penetrating through the first light emitting device and a transfer solder ball bonding the transfer penetration electrode to the first data source and the first light receiving device may include a receiving penetration electrode penetrating through the first light receiving device and a receiving solder ball bonding the receiving penetration electrode to the second data source.

In an example embodiment, the optical connector may further include a second input device connected to the second data source and to which a second input signal may be applied, a second light emitting device connected to the second input device and generating a second optical signal corresponding to the second input signal such that the second optical signal may travel in a direction reverse to the first optical signal, a second light receiving device positioned close to the second light emitting device in such a configuration that the second optical signal may directly reach the second light receiving device from the second light emitting device such that the second light receiving device may generate a second output signal corresponding to the second optical signal, and a second output device connected to the second light receiving device and to the first data source to which the second output signal may be transferred.

In an example embodiment, the optical signal may further include a first circuit board connected to the first data source and to which the first input device and the first light emitting device and the second light receiving device and the second output device may be mounted and a second circuit board connected to the second data source and to which the first output device and the first light receiving and the second input device and the second light emitting device may be mounted.

In an example embodiment, the first input device and the first light emitting device may be connected with each other by a first bonding wire as a first signal transfer package, and the second light receiving device and the second output device may be connected with each other by a second bonding wire as a second signal receiving package. The first output device and the first light receiving device may be connected with each other by a third bonding wire as a first signal receiving package and the second light emitting device and the second input device may be connected with each other by a fourth bonding wire as a second signal transfer package.

In an example embodiment, the first light emitting device and the second light receiving device may be directly connected to the first data source through a first transfer penetration electrode and a second receiving penetration electrode, respectively, and the first input device and the second output device may be positioned in an inside of the first data source. The first light receiving device and the second light emitting device may be directly connected to the second data source through a first receiving penetration electrode and a second transfer penetration electrode, respectively, and the first output device and the second input device may be positioned in an inside of the second data source.

In an example embodiment, the first and the second light emitting devices may further include focusing lenses for focusing the first and the second optical signals to the first and the second light receiving devices, respectively.

According to some example embodiments, there is provided a stack module including first and second component modules spaced apart from each other and having a plurality of conductive structures; and an optical connector including a first light emitting device on a contact face of the first component module and a first light receiving device on a corresponding face of the second component module in such a configuration that the first light emitting device may generate a first optical signal according to a first input signal of the first component module and the first optical signal directly may reach the first light receiving device without a light transfer unit.

In an example embodiment, the optical connector may further include a second light emitting device on the corresponding face of the second component module and a second light receiving device on the contact face of the first component module in such a configuration that the second light emitting device may generate a second optical signal according to a second input signal of the second component module and the second optical signal may directly reach the second light receiving device without a light transfer unit.

In an example embodiment, the first light emitting device and the second light receiving device may further include a first transfer penetration electrode and a second receiving penetration electrode that may penetrate through the first light emitting device and the second light receiving device, respectively, to thereby make contact with the first component module. The first light receiving device and the second light emitting device may also further include a first receiving penetration electrode and a second transfer penetration electrode that penetrate through the first light receiving device and the second light emitting, respectively, to thereby make contact with the second component module.

In an example embodiment, the stack module may further include a first input device connected to the first light emitting device by a wire bonding and to which the first input signal is applied, a second output device connected to the second light receiving device by a wire bonding and from which a second output signal corresponding to the second optical signal is transferred, a first circuit board connected to the first component module and to which the first input device, the first light emitting device, the second light receiving device and the second output device may be mounted, a first output device connected to the first light receiving device by a wire bonding and from which a first output signal corresponding to the first optical signal may be transferred, a second input device connected to the second light emitting device by a wire bonding and to which the second input signal may be applied, and a second circuit board connected to the second component module and to which the first output device, the first light receiving device, the second light emitting device and the second input device may be mounted.

According to example embodiments of the present inventive concept, the optical connector may include a pair of light emitting device and a light receiving device that may be positioned close to each other and face each other, to there by transfer the large-size data by using optical signals without any additional light transfer units. Particularly, the pair of the light emitting device and the light receiving device may be respectively installed to a data source and a data destination, to thereby perform a two-way data communication. Thus, the occupancy space for the optical connector may be sufficiently reduced in the electronic system because the optical connection may not require the light transfer units such as the optical cable and the reflector.

Further, the optical connector may be applied to an individual product, such as a data transfer socket, and thus the digital data in individual storage devices may be transferred through the optical connector by using optical signals without any additional light transfer units. In addition, the optical connector may also be applied to a connection component between adjacent operational modules of the electronic systems, thereby increasing the data transfer speed between the modules in the electronic system. Further still, the optical connector may be provided as a data interface of the electronic system between the electronic system and the external data storage, thereby increasing the data transfer speed between the electronic system and the external data storage.

BRIEF DESCRIPTION OF THE DRAWINGS

Example embodiments will be more clearly understood from the following detailed description taken in conjunction with the accompanying drawings.

DETAILED DESCRIPTION OF THE EMBODIMENTS

Figure 1:
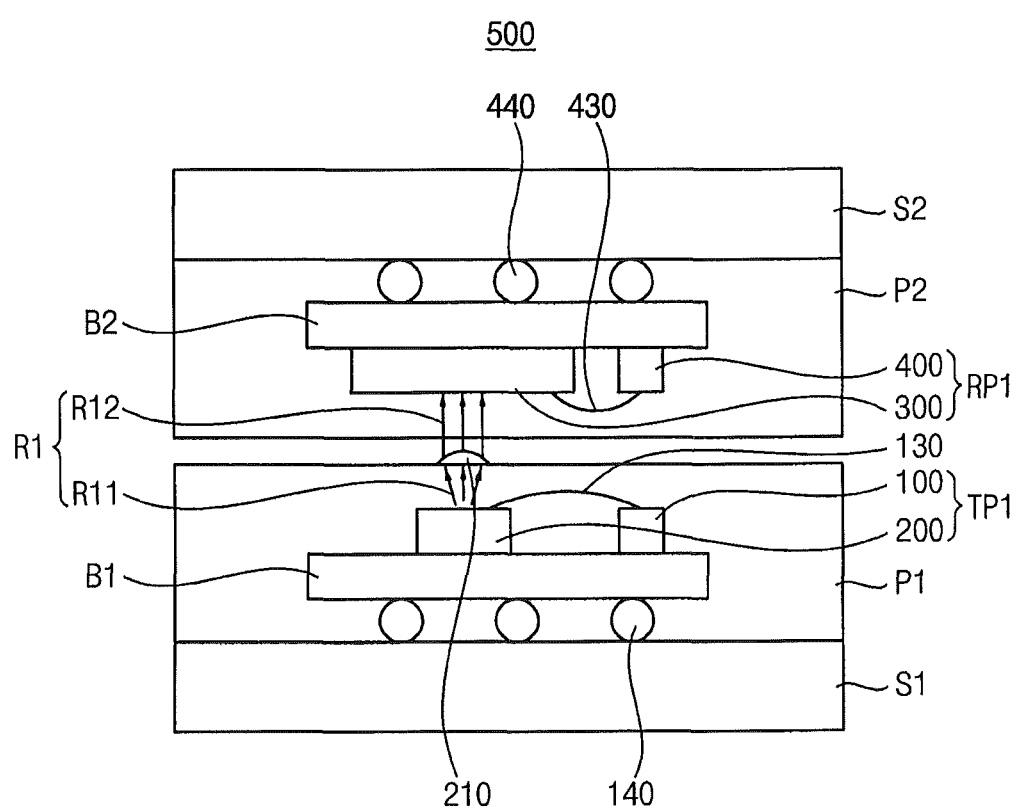
FIG. 1 is a cross-sectional view illustrating an optical connector in accordance with a first example embodiment of the present inventive concept.

Various example embodiments will be described more fully hereinafter with reference to the accompanying drawings, in which some example embodiments are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Optical Connector

FIG. 1 is a cross-sectional view illustrating an optical connector in accordance with a first example embodiment of the present inventive concept.

Referring to FIG. 1, an optical connector 500 in accordance with a first example embodiment of the present inventive concept may include a first input device 100 connected to a first data source S1 and to which a first input signal is applied, a first light emitting device 200 connected to the first input device 100 and generating a first optical signal corresponding to the first input signal, a first light receiving device 300 positioned close to the first light emitting device 200 in such a configuration that the first optical signal directly reaches the first light receiving device 300 from the first light emitting device 200, and a first output device 400 connected to the first light receiving device 300 and to a second data source S2 to which the first output signal is transferred. The first light receiving device 300 may generate a first output signal corresponding to the first optical signal.

For example, the first input device 100 may include a high-integrated integrated circuit (IC) device having a plurality of semiconductor devices and at least a logic chip for processing the first input signal and driving the first light emitting device 200. Particularly, the first input device 100 may include a single IC chip having logic circuits or include a single semiconductor package having at least an IC chip and at least a memory chip that may be stacked by a semiconductor package process.

The light emitting device 200 may include a light source (not shown) for generating the first optical signal R1 according to the first input signal and an emitting activator (not shown) for activating the light source. The emitting activator may include a single diode or a single transistor. The emitting activator may be activated by a digital signal corresponding to the first input signal and the first optical signal R1 may be generated from the light source responsive to activation of the emitting activator. The emitting activator may include a separate IC chip in the first light emitting device 200 independent from the first input device 100. Otherwise, the emitting activator may be provided as a part of the first input device 100. In the present example embodiment, the first light emitting device 200 may include a light emitting diode (LED) and a vertical cavity surface emitting laser (VSEL).

The light receiving device 300 may be positioned to face the first light emitting device 200 and may include a light destination (not shown) to which the first optical signal R1 may reach and a signal generator (not shown) for generating the first output signal according to the first optical signal R1. For example, the light destination may include a convex lens comprising a transparent resin and, thus, the first optical signal R1 may be efficiently focused to the light destination and the signal generator may include a diode or a transistor for generating a digital signal corresponding to the first optical signal R1. In the present example embodiment, the first light receiving device 700 may include at least a photo diode chip.

Particularly, the first light receiving device 300 may be positioned close to the first light emitting device 200 and, thus, the first optical signal R1 generated from the light source may reach the light destination without any light transfer units, such as an optical cable and a reflector. That is, the first light emitting device 200 and the first light receiving device 300 may be positioned so close to each other that the first optical signal R1 may sufficiently reach the first light receiving device 300 from the light emitting device 200 without any light transfer units.

In the present example embodiment, the light emitting device 200 may have a larger surface than that of the light receiving device 300, thereby facilitating the direct incidence or reach of the first optical signal R1 to the light receiving device 300 from the light emitting device 200. For example, the light source of the light emitting device 200 may include a point light source for generating a laser and the light destination of the light receiving device 300 may include a detection lens that may be positioned around the point light source and have a sufficiently large surface as compared with the point light source. Most of the first optical signal R1 can directly reach the light receiving device 300 from the light emitting device 200 without a substantial optical loss although light transfer units may not be provided between the light emitting device 200 and the light receiving device 300. Accordingly, a short gap distance between the light emitting device 200 and the light receiving device 300 and a large surface of the light destination of the light receiving device 300 may sufficiently improve the transfer efficiency of the first optical signal R1 in spite of no light transfer unit.

Particularly, a first focusing lens 210 may be further provided on the first light emitting device 200 so as to improve the transfer efficiency of the first optical signal R1. For example, a collimator for reinforcing the linearity of light may be positioned on the light source of the light emitting device 200. In such a case, the first optical signal R1 may be prevented from being refracted by the collimator and, thus, the linearity of the first optical signal R1 may be improved. Therefore, the first optical signal R1 may be sufficiently prevented from passing off from the light destination of the light receiving device 300, to thereby improve the transfer efficiency of the first optical signal R1.

The first output device 400 may include a high-integrated integrated circuit (IC) device having a plurality of semiconductor devices similar to the first input device 100. The first output device 400 may be connected to the first light receiving device 300 and the second data source S2 and, thus, may transfer the first output signal to the second data source S2 from the first light receiving device 300. Particularly, the first output device 400 may also include a single IC chip having logic circuits or include a single semiconductor package having at least an IC chip and at least a memory chip that may be stacked by a semiconductor package process like the first input device 100.

The first input device 100, the first light emitting device 200, the first light receiving device 300, and the first output device 400 may be assembled through various assembly processes, to thereby form various types of the optical connector 500. That is, the optical connector 500 may be modified into various types in accordance with the requirements and usage conditions of the product including the optical connector 500.

For example, the first input device 100 and the first light emitting device 200 may be mounted onto a first board B1 that may be connected to the first data source S1 while the first output device 400 and the first light receiving device 300 may be mounted onto a second board B2 that may be connected to the second data source S2. The first and the second boards B1 and B2 may include a printed circuit board (PCB).

The light emitting device 200 and the first input device 100 on the first PCB B1 may be connected with each other by a first bonding wire 130, which may function as a first transfer package TP1. In a similar way, the light receiving device 300 and the first output device 400 on the second PCB B2 may be connected with each other by a second bonding wire 430, which may function as a first receiving package RP1. The first transfer package TP1 including the PCB B1 may be connected to the first data source S1 via a first signal terminal 140 and the first receiving package RP1 including the second PCB B2 may be connected to the second data source S2 via a second signal terminal 440. The first and the second signal terminals 140 and 440 may include a cylindrical connection electrode and a solder ball.

Accordingly, the first input signal may be transferred to the first input device 100 from the first data source S1 via the first signal terminal 140 and then may be transformed into the first optical signal R1 at the first light emitting device 200. Then, the first optical signal R1 may be directly transferred to the light receiving device 300 without any light transfer units. The first optical signal R1 detected from the first light receiving device 300 may be transformed into the first output signal and the first output signal may be transferred to the second data source S2 via the second signal terminal 440.

The first input device 100 may further include additional devices for signal conversion of the first input signal and the additional devices may also be mounted on the first PCB B1 and be connected to the first PCB B1 by a bonding wire. Thus, the first input signal may be converted into a preliminary signal prior to the transfer of the first input signal to the first light emitting device 200. For example, the additional devices may include an analogue-to-digital converter (ADC) mounted on the first PCB B1. When the first input signal is generated from the first data source S1 as an analogue signal, the analogue first input signal may be converted into a digital first input signal by the ADC and the digital first input signal may be transferred to the first light emitting device 200.

In the same way, the first output device 400 may further include additional devices for signal conversion of the first output signal and the additional devices may also be mounted on the second PCB B2 and be connected to the second PCB B2 by a bonding wire. Thus, the first output signal may be converted into a preliminary signal prior to the transfer of the first output signal to the second data source S2. For example, the additional devices may include a digital-to-analogue converter (DAC) mounted on the second PCB B2. When the first output signal may be generated from the first output device S2 as a digital signal, the digital first output signal may be converted into an analogue first output signal by the DAC and the analogue first output signal may be transferred to the second data source S2.

Various other additional devices as well as the ADC and DAC may also be mounted on the first and the second PCB B1 and B2 in accordance with the operation surroundings and requirements of the system including the optical connector, thereby enlarging the usage field of the optical connector 500.

A first passivation layer P1 and a second passivation layer P2 may be further provided on the first and the second PCBs B1 and B2, respectively, and, thus, the first transfer package TP1 and the first receiving package RP1 may be protected from surroundings by the first and the second passivation layers P1 and P2, respectively. For example, the first and the second passivation layers P1 and P2 may comprise a transparent resin having high optical transmittance. Thus, optical absorption of the first optical signal R1 into the first and the second passivation layers P1 and P2 may be reduced or minimized due to the high optical transmittance to thereby reduce or minimize the decrease of the transfer efficiency of the first optical signal R1 caused by the passivation layers P1 and P2.

In such a case, the first focusing lens 210 for improving the transfer efficiency of the first optical signal R1 may be selectively arranged on one of the first light emitting device 200 and the first passivation layer P1.

According to the optical connector 500, the first optical signal R1 may be transferred from the first data source S1 to the second data source S2 without any conventional light transfer units, such as the optical cable and the reflector with high speed and reliability. Therefore, much less occupancy space may be needed for the optical connector 500 between the first and the second data sources S1 and S2 while improving the data transfer speed and reliability between the first and the second data sources S1 and S2.

While the present example embodiment discloses that the first input device 100 and the first light emitting device 200 may be horizontally arranged on the first PCB B1 and the first output device 400 and the first light receiving device 300 may be horizontally arranged on the second PCB B2 and, thus, the first transfer package TP1 and the first receiving package RP1 may be horizontally configured on the respective first and the second PCBs B1 and B2, any other arrangements of the first transfer package TP1 and the first receiving package RP1 could be used when the first light emitting device 200 is electrically connected to the first input device 100 and the first light receiving device 300 is electrically connected to the first output device 400. For example, the first light emitting device 200 may be stacked on the first input device 100 and the first light receiving device 300 may be stacked on the first output device 400, to thereby form a transfer stack package and a receiving stack package. In another modification, the first input device 100 may be positioned in an inside of the first data source S1 and/or the first output device 400 may be positioned in an inside of the second data source S2.

Figure 2A:
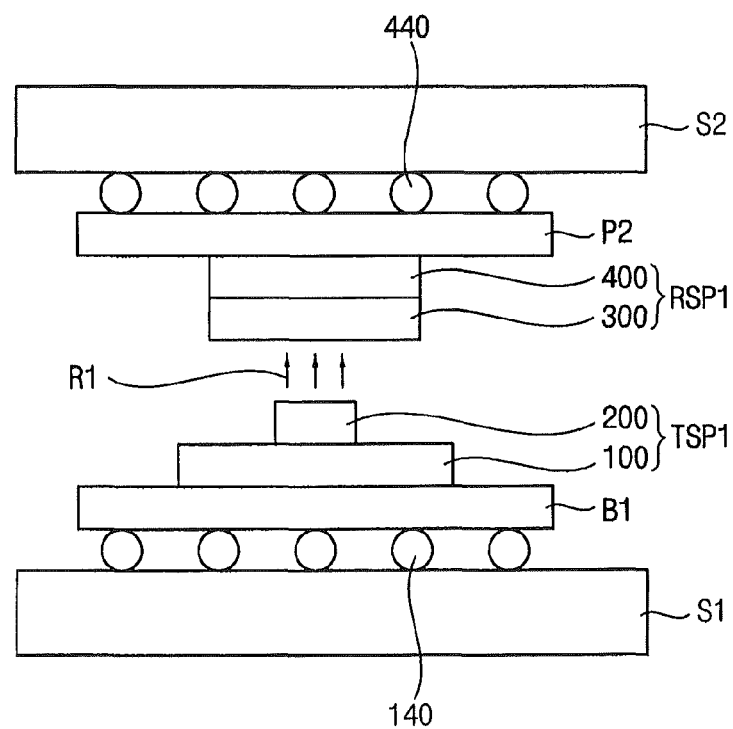
FIG. 2A is a cross-sectional view illustrating a first modification of the optical connector in FIG. 1.

FIG. 2A is a cross-sectional view illustrating a first modification of the optical connector in FIG. 1.

Referring to FIG. 2A, the first light emitting device 200 may be stacked on the first input device 100 as a single package by a semiconductor package process, which may function as a first transfer stack package TSP1. For example, at least a logic circuit chip for driving the first light emitting device 200 and some memory chips may be arranged in the first input device 100 and the light emitting device 200 may be stacked on the first input device in such a configuration that the light emitting device 200 may be electrically connected to the logic chip, to thereby manufacture the first transfer stack package TSP1 in a system-in-package. Otherwise, the first input device 100 and the first light emitting device 200 may be individually manufactured into a respective single chip and an upper chip for the first light emitting device 200 may be stacked on a lower chip for the first input device 100, to thereby manufacture the first transfer stack package TSP1 in a chip stack package. The first transfer stack package TSP1 may be positioned on the first PCB B1 and the first PCB B1 may be connected to the first data source S1 via the first signal terminals 140.

In the same way as the first transfer stack package TSP1, the first light receiving device 300 may be stacked on the first output device 400 as a single package by a semiconductor package process, which may function as a first receiving stack package RSP1. The first receiving stack package RSP1 may be positioned on the second PCB B2 and the second PCB B2 may be connected to the second data source S2 via the second signal terminals 440.

In the present example embodiment, the first transfer stack package TSP1 and the first receiving stack package RSP1 may be positioned close to each other, and more particularly, positioned to face each other, and, thus, the first optical signal R1 may reach or be transferred to the first light receiving device 300 from the first light emitting device 200 without any light transfer units with high speed and high reliability.

Figure 2B:
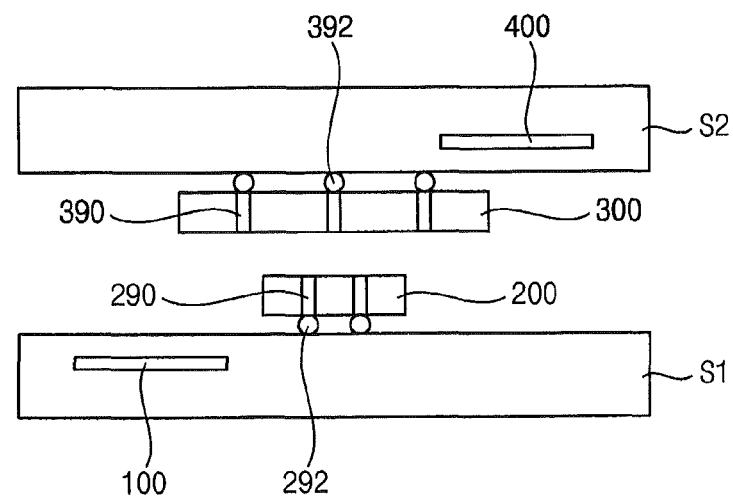
FIG. 2B is a cross-sectional view illustrating a second modification of the optical connector in FIG. 1.

FIG. 2B is a cross-sectional view illustrating a second modification of the optical connector in FIG. 1.

Referring to FIG. 2B, the first light emitting device 200 may make direct contact with the first data source S1 and the first light receiving device 300 may make direct contact with the second data source S2, while the first input device 100 may be positioned in an inside of the first data source S1 and the first output device 400 may be positioned in an inside of the second data source S2.

Particularly, the first light emitting device 200 may include a first transfer penetration electrode 290 penetrating through the first light emitting device 200 and a first transfer solder ball 292 bonding the first transfer penetration electrode 290 to the first data source S1. The first light receiving device 300 includes a first receiving penetration electrode 390 penetrating through the first light receiving device 300 and a first receiving solder ball 392 bonding the receiving penetration electrode 390 to the second data source S2.

For example, the light emitting device 200 and the light receiving device 300 may be positioned close to each other and, more particularly, positioned to face each other. For example, the light emitting device 200 may include a plurality of IC chips and the first transfer penetration electrode 290 may make contact with a contact pad of the IC chips through the light emitting device 200. In the same way, the light receiving device 300 may also include a plurality of IC chips and the first receiving penetration electrode 290 may make contact with a contact pad of the IC chips through the light receiving device 300. The first transfer solder balls 292 may be arranged on a bottom of the light emitting device 200 and may make contact with the first transfer penetration electrode 290. The first transfer solder balls 292 may be bonded to the first data source S1, and, thus, the light emitting device 200 may be connected to the first data source S1 via the first transfer penetration electrode 290 and the first transfer solder balls 292. The first receiving solder balls 392 may also be arranged on a bottom of the light receiving device 300 and may make contact with the first receiving penetration electrode 390. The first receiving solder balls 392 may be bonded to the second data source S2, and, thus, the light receiving device 300 may be connected to the second data source S2 via the first receiving penetration electrode 390 and the first receiving solder balls 392.

Therefore, the first light emitting device 200 and the light receiving device 300 may make direct contact with the first data source S1 and the second data source S2, respectively, through the respective penetration electrode and the solder balls, and the first input device 100 and the first output device 400 may be positioned in the inside of the first and the second data sources S1 and S2, respectively. Accordingly, the occupancy spaces for the light emitting device 200 and the first light receiving device 300 may be sufficiently reduced between the first data source S1 and the second data source S2. In addition, no light transfer units may be needed between the first data source S1 and the second data source S2. Accordingly, the occupancy space for the optical connector 500 may be remarkably reduced between the first data source S1 and the second data source S2 without any deterioration of the data transfer speed and reliability through the optical connector 500.

While the present example embodiment in FIGS. 2A and 2B discloses that the first transfer package TP1, the first receiving package RP1, the first transfer stack package TSP1 and the first receiving stack package RSP1 may be protected from surroundings by the passivation layer, such as a transparent layer, the passivation layer may also be partially open to expose the respective transfer package and the receiving package, thereby improving the transfer efficiency of the first optical signal R1.

Figure 2C:
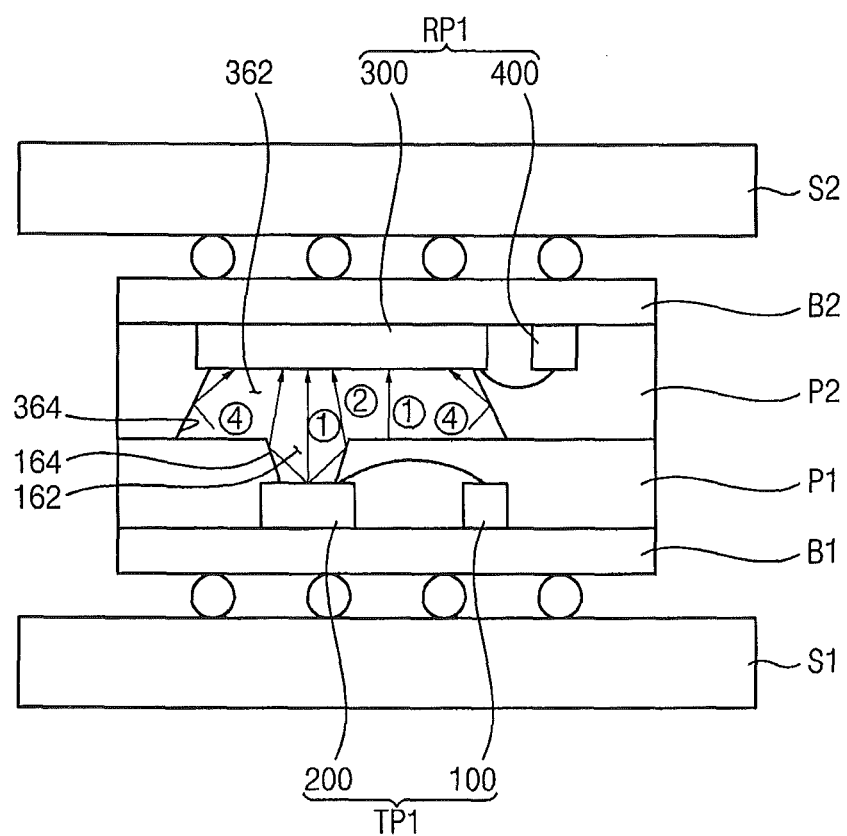
FIG. 2C is a cross-sectional view illustrating a third modification of the optical connector in FIG. 1.

FIG. 2C is a cross-sectional view illustrating a third modification of the optical connector in FIG. 1.

Referring to FIG. 2C, the first passivation layer P1 may be partially open in such a way that the first light emitting device 200 may be exposed and the second passivation layer P2 may be partially open in such a way that the first light receiving device 300 may be exposed, and, thus, the transfer efficiency of the first optical signal R1 may be increased while the first transfer package TP1 and the first receiving package RP1 may be still protected by the first and the second passivation layers P1 and P2, respectively.

For example, the first passivation layer P1 may include a first opening 162 through which the first light emitting device 200 may be exposed and the second passivation layer P2 may include a second opening 362 through which the first light receiving device 300 may be exposed. The first and second openings 162 and 362 may be defined by first and second slant surfaces 164 and 364 of the first and the second passivation layers P1 and P2, respectively, and may be arranged in such a configuration that the first and the second openings 162 and 362 may be arranged to face each other. In the present example embodiment, the second opening 362 may have a size larger than that of the first opening 162 because the surface area of the first light receiving device 300 may be much larger than that of the first light emitting device 200.

Particularly, the first slant surface 164 may be slanted in an upwardly-wide direction, so that an upper portion of the first opening 162 close to the second opening 362 may be larger than a lower portion thereof close to the light emitting device 200. Thus, the first optical signal R1 may be reflected toward the light receiving device 300 not toward the light emitting device 200 from the first slant surface 164.

In the first opening 162, a non-reflected portion (①) of the first optical signal R1 may pass toward the light receiving device 300 from the light emitting device 200 regardless of the first passivation layer P1 and a reflected portion (②) of the first optical signal R1 may be much more reflected toward the light receiving device 300 from the slant surface 164, to thereby increase the intensity of the first optical signal R1.

In contrast, the second slant surface 364 may be slanted in a downwardly-wide direction, so that an upper portion of the second opening 362 close to the light receiving device 300 may be smaller than a lower portion thereof close to the first opening 162. Thus, the first optical signal R1 may be reflected toward the light receiving device 300 not toward the light emitting device 200 from the second slant surface 364.

In the second opening 362, a non-reflected portion (③) of the first optical signal R1 may directly reach the light receiving device 300 from the light emitting device 200 regardless of the second passivation layer P2 and a reflected portion (④) of the first optical signal R1 may be much more reflected toward the light receiving device 300 from the slant surface 164, to thereby increase the intensity of the first optical signal R1.

While the above example embodiments disclose a one-way data transfer from the first data source S1 to the second data source S2, a two-way data transfer between the first and the second data sources S1 and S2 could be performed by providing an additional optical connector between the first data source S1 to the second data source S2, thereby performing an interactive data communication between the first data source S1 to the second data source S2.

Figure 3:
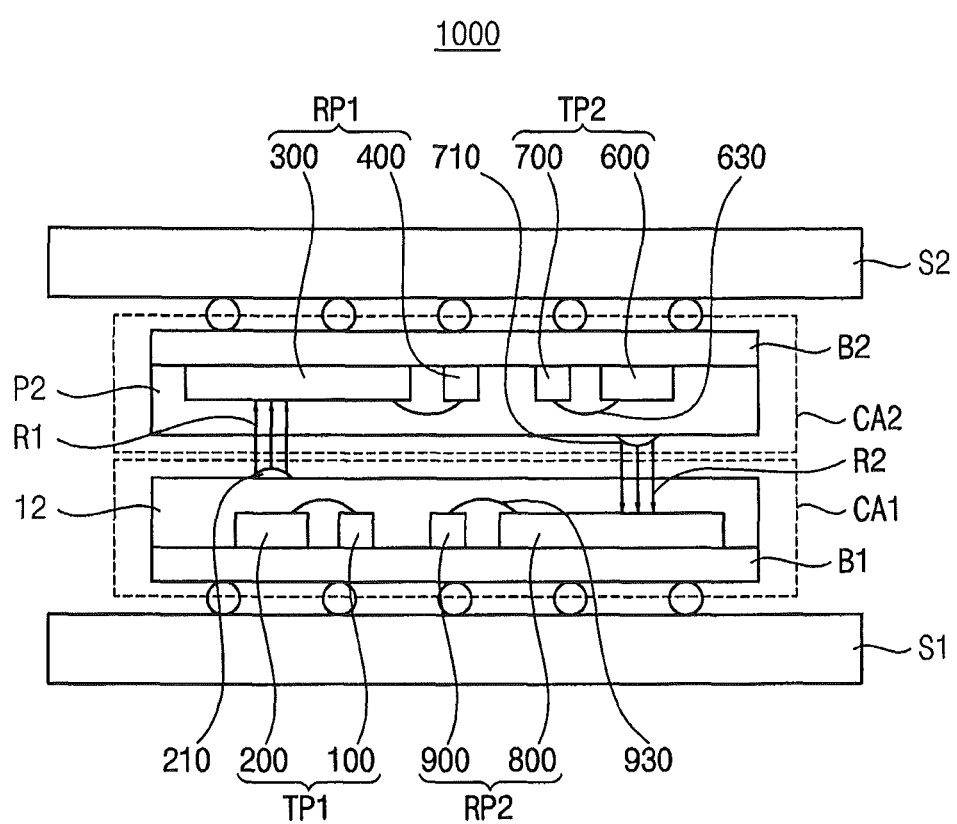
FIG. 3 is a cross-sectional view illustrating an optical connector in accordance with a second example embodiment of the present inventive concept.

FIG. 3 is a cross-sectional view illustrating an optical connector in accordance with a second example embodiment of the present inventive concept. The optical connector in FIG. 3 may have substantially the same structure as the optical connector in FIG. 1, except that a second receiving package may be further provided adjacent to the first transfer package and a second transfer package may be further provided adjacent to the first receiving package. Thus, in FIG. 3, the same reference numerals denote the same elements in FIG. 1, and any further detailed descriptions on the same elements will be omitted hereinafter.

Referring to FIG. 3, an optical connector 1000 in accordance with a second example embodiment of the present inventive concept may include additional elements added to the optical connector 500 shown in FIG. 1. Particularly, the optical connector 1000 may further include a second input device 600 connected to the second data source S2 and to which a second input signal may be applied, a second light emitting device 700 connected to the second input device 600 and generating a second optical signal R2 corresponding to the second input signal, a second light receiving device 800 positioned close to the second light emitting device 700 in such a configuration that the second optical signal R2 directly reaches the second light receiving device 800 from the second light emitting device 700 and a second output signal corresponding to the second optical signal R2 may be generated from the light receiving device 80, and a second output device 900 connected to the second light receiving device 800 and to the first data source S1 to which the second output signal is transferred. In such a case, the second optical signal may travel in a direction reverse to the first optical signal R1.

For example, the second input device 600 and the second light emitting device 700 may have substantially the same structures as the first input device 100 and the first light emitting device 200, respectively. In addition, the second output device 900 and the second light receiving device 800 may have substantially the same structures as the first output device 400 and the first light receiving device 300, respectively. Thus, any detailed descriptions on the second input device 600, the second light emitting device 700, the second light receiving device 800 and the second output device 900 may be omitted. However, various modifications of the second input device 600, the second light emitting device 700, the second light receiving device 800 and the second output device 900 would be used for the optical connector 1000 when second optical signal R2 is generated according to the second input signal and directly reaches the second light receiving device from the second light emitting device.

For example, the second input device 600 and the second light emitting device 700 may be mounted on the second PCB B2 and may be connected with each other by a third wire bonding 630, which may function as a second transfer package TP2. Thus, the first receiving package RP1 and the second transfer packages TP2 may be mounted on the second PCB B2 adjacent to each other. In the same way, the second output device 900 and the second light receiving device 800 may be mounted on the first PCB B1 and may be connected with each other by a fourth wire bonding 930, which may function as a second receiving package RP2. Thus, the first transfer package TP1 and the second receiving package RP2 may be mounted on the first PCB B1 adjacent to each other.

Therefore, the first transfer package TP1 and the second receiving package RP2 may be mounted on the first PCB B1 and may be covered with the first passivation layer P1 and the first receiving package RP1 and the second transfer package TP2 may be mounted on the second PCB B2 and may be covered with the second passivation layer P2. In addition, a second focusing lens 710 may be further provided on the second light emitting device 700 just like the first focusing lens on the first light emitting device 200, to thereby increase the transfer efficiency of the first and the second optical signals R1 and R2.

In addition, the second light emitting device 700 and the second light receiving device 800 may be positioned close to each other like the first light emitting device 200 and the first light receiving device 300, respectively, and, thus, the second optical signal R2 generated from the light source of the second light emitting device 700 may reach the light destination of the second light receiving device 800 without any light transfer units, such as an optical cable and a reflector.

Therefore, data in the first data source S1 may be transferred to the second data source S2 through a first connector including the first transfer package TP1 and the first receiving package RP1, and data in the second data source S2 may be transferred to the first data source S1 through a second connector including the second transfer package TP2 and the second receiving package RP2, thereby performing a two-way data communication between the first and the second data sources S1 and S2 by the optical connector 1000. Particularly, because the data communication may be performed through the first and the second optical signals R1 and R2, large-size data may be transferred with high speed and high reliability between the first and the second data sources S1 and S2, which may enable real-time interactive data communication between the first and the second data sources S1 and S2.

While the present example embodiment discloses that the first input device 100, the first light emitting device 200, the second light receiving device 800 and the second output device 900 may be horizontally arranged on the first PCB B1 and the first light receiving device 300, the first output device 400, the second input device 600 and the second light emitting device 700 may be horizontally arranged on the second PCB B2 and, thus, the first transfer package TP1 and the second receiving package RP2 may be horizontally configured on the first PCB B1 and the first receiving package RP1 and the second transfer package TP2 may be horizontally configured on the second PCB B2, any other arrangements or modifications of the first and the second transfer packages TP1 and TP2 and the first and the second receiving packages RP1 and RP2 may be used when the first light emitting device 200 is electrically connected to the first input device 100 and the first light receiving device 300 is electrically connected to the first output device 400 and the second light emitting device 700 is electrically connected to the second input device 600 and the second light receiving device 800 is electrically connected to the second output device 900.

Figure 4A:
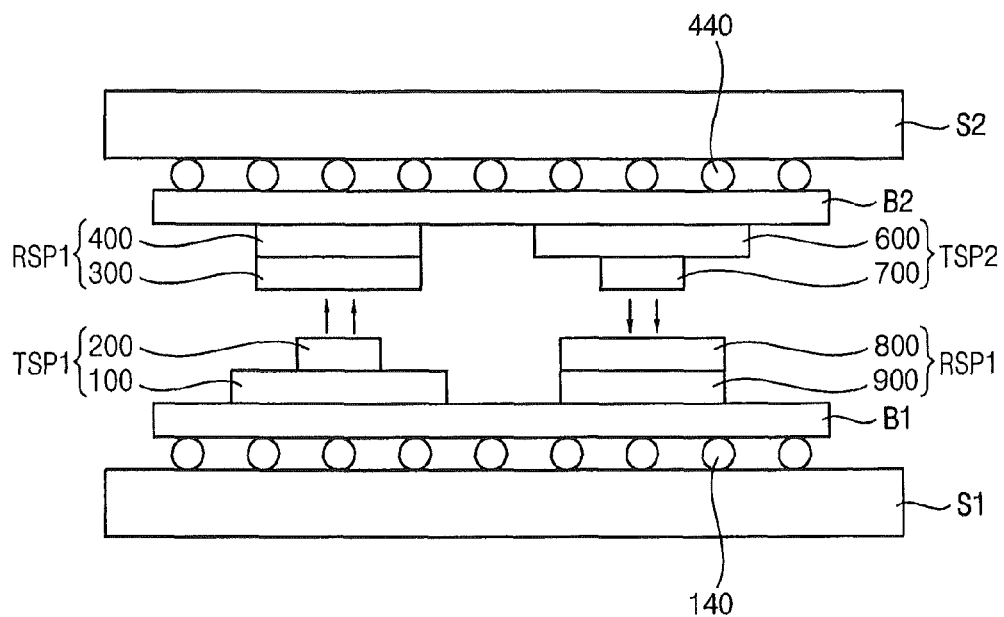
FIG. 4A is a cross-sectional view illustrating a first modification of the optical connector in FIG. 3.

FIG. 4A is a cross-sectional view illustrating a first modification of the optical connector in FIG. 3.

Referring to FIG. 4A, the first light emitting device 200 may be stacked on the first input device 100 as a single package by a semiconductor package process, which may function as a first transfer stack package TSP1. In addition, the second light receiving device 800 may be stacked on the second output device 900 as a single package by a semiconductor package process, which may function as a second receiving stack package RSP2. The first transfer stack package TSP1 and the second receiving stack package RSP2 may be packaged into a system-in-package or a chip stack package. The first transfer stack package TSP1 and the second receiving stack package RSP2 may be mounted on the first PCB B1 that may be connected to the first data source S1 via the first signal terminals 140.

In the same way, the first light receiving device 300 may be stacked on the first output device 400 as a single package by a semiconductor package process, which may function as a first receiving stack package RSP1. In addition, the second light emitting device 700 may be stacked on the second input device 600 as a single package by a semiconductor package process, which may function as a second transfer stack package TSP2. The first receiving stack package RSP1 and the second transfer stack package TSP2 may be packaged into a system-in-package or a chip stack package. The first receiving stack package RSP1 and the second transfer stack package TSP2 may be mounted on the second PCB B2 that may be connected to the second data source S2 via the first signal terminals 440.

In the present example embodiment, the first transfer stack package TSP1 and the first receiving stack package RSP1 may be positioned close to each other in such a way that the first transfer stack package TSP1 and the first receiving stack package RSP1 may face each other and the second transfer stack package TSP2 and the second receiving stack package RSP2 may be positioned close to each other in such a way that the second transfer stack package TSP2 and the second receiving stack package RSP2 may face each other. Thus, the first optical signal R1 may reach or be transferred to the first light receiving device 300 from the first light emitting device 200 and the second optical signal R2 may reach or be transferred to the second light receiving device 800 from the second light emitting device 700 without any light transfer units with high speed and high reliability. Accordingly, large-size data may be transferred with high speed and high reliability between the first and the second data sources S1 and S2, which may enable real-time interactive data communication between the first and the second data sources S1 and S2.

Figure 4B:
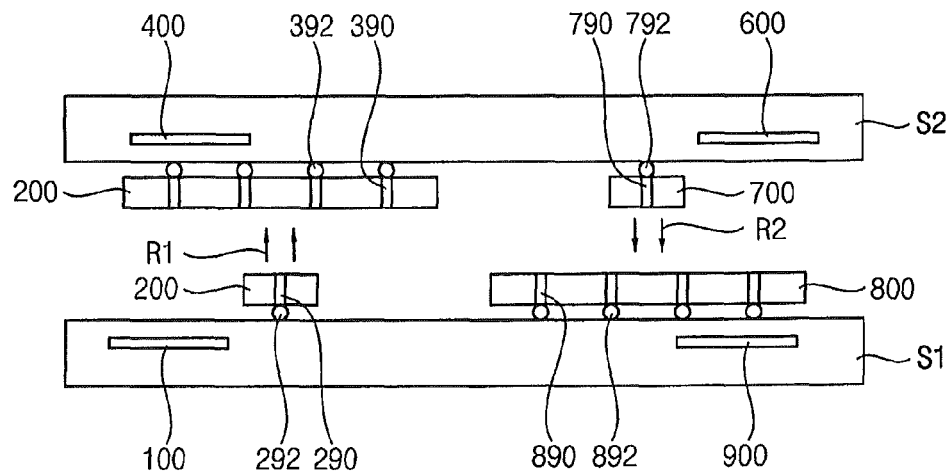
FIG. 4B is a cross-sectional view illustrating a second modification of the optical connector in FIG. 3.

FIG. 4B is a cross-sectional view illustrating a second modification of the optical connector in FIG. 3.

Referring to FIG. 4B, the first light emitting device 200 and the second light receiving device 800 may make direct contact with the first data source S1 and the first light receiving device 300 and the second light emitting device 700 may make direct contact with the second data source S2, while the first input device 100 and the second output device 900 may be positioned in an inside of the first data source S1 and the first output device 400 and the second input device 600 may be positioned in an inside of the second data source S2.

Particularly, the second light emitting device 700 may be connected to the second data source S2 via a second transfer penetration electrode and the second light receiving device 800 may be connected to the first data source S1 via a second receiving penetration electrode in a similar way of the first light emitting device 200 and the first light receiving device 300. The second light emitting device 700 may include the second transfer penetration electrode 790 penetrating through the second light emitting device 700 and a second transfer solder ball 792 bonding the second transfer penetration electrode 790 to the second data source S2. The second light receiving device 800 includes a second receiving penetration electrode 890 penetrating through the second light receiving device 800 and a second receiving solder ball 892 bonding the receiving penetration electrode 890 to the first data source S1.

The second transfer penetration electrode 790 and the second receiving penetration electrode 890 may have substantially the same structure as the first transfer penetration electrode 290 and the first receiving penetration electrode 390, respectively. In addition, the second transfer solder ball 792 and the second receiving solder ball 892 may have substantially the same structure as the first transfer solder ball 292 and the first receiving solder ball 392.

Therefore, the first light emitting device 200 and the second light receiving device 800 may make direct contact with the first data source S1 through the first transfer penetration electrode 290 and the second receiving penetration electrode 890 and via the first transfer solder balls 292 and the second receiving solder balls 892. In addition, the first light receiving device 300 and the second light emitting device 700 may make direct contact with the second data source S2 through the first receiving penetration electrode 390 and the second transfer penetration electrode 790 and via the first receiving solder balls 392 and the second transfer solder balls 792. Further, the first input device 100 and the second output device 900 may be positioned in an inside of the first data source S1 and the first output device 400 and the second input device 600 may be positioned in an inside of the second data source S2. Accordingly, the occupancy spaces for the first light emitting device 200 and the first light receiving device 300 and for the second light emitting device 700 and the second light receiving device 800 may be sufficiently reduced between the first data source S1 and the second data source S2. In addition, no light transfer units may be needed between the first data source S1 and the second data source S2. Accordingly, the occupancy space for the optical connector 1000 may be remarkably reduced between the first data source S1 and the second data source S2 without any deterioration of the data transfer speed and reliability through the optical connector 1000.

In a modified example, because the first light emitting device 200 and the second light receiving device 800 may be adjacent to each other and the first light receiving device 300 and the second light emitting device 700 may be adjacent to each other, various modifications may be used for reducing or minimizing the data transfer interference between the first transfer package TP1 and the second receiving package RP2.

Figure 4C:
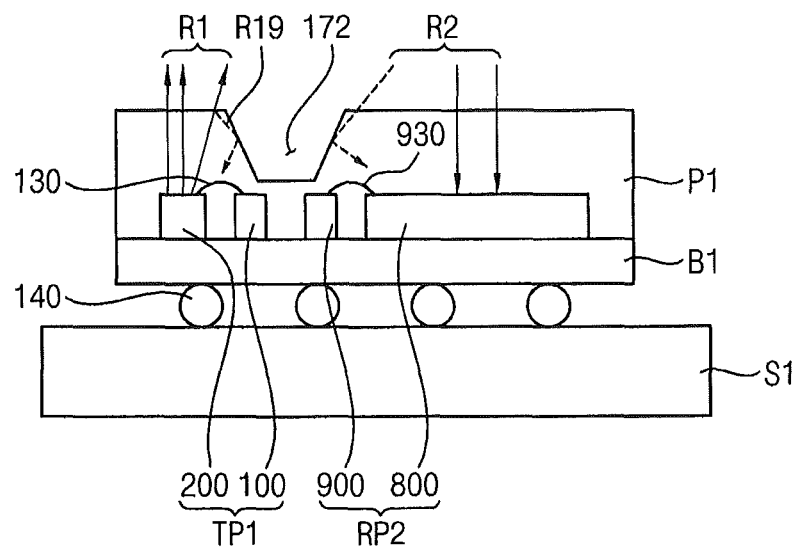
FIGS. 4C and 4D are cross-sectional views illustrating third modifications of the optical connector in FIG. 3.
Figure 4D:
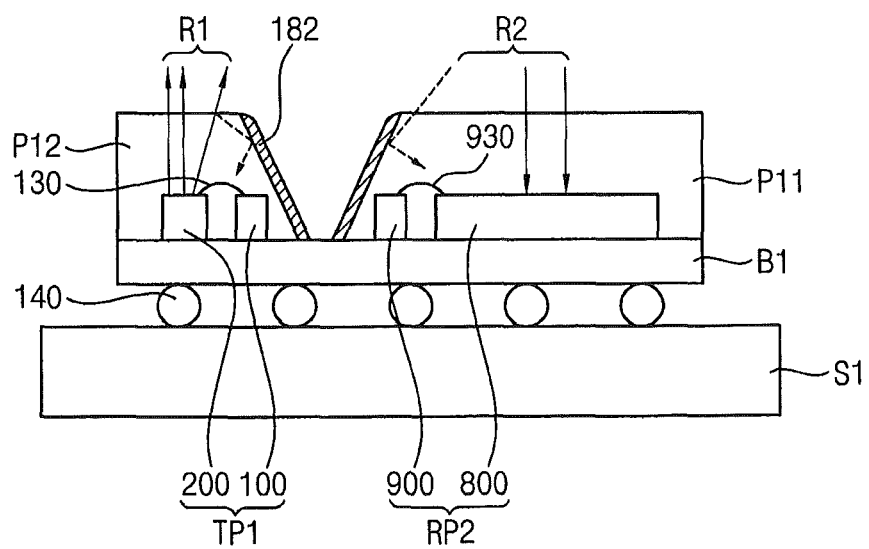

FIGS. 4C and 4D are cross-sectional views illustrating third modifications of the optical connector in FIG. 3.

In FIGS. 4C and 4D, the first transfer package TP1 and the second receiving package RP2 are referred to as first connector assembly CA1 and the first receiving package RP1 and the second transfer package TP2 are referred to as second connector assembly CA2. The modification on the first connector assembly CA1 may also be allowable on the second connector assembly CA2.

Referring to FIG. 4C, the first connector assembly CA1 may be mounted on the first PCB B1 and may be protected from surroundings by the first passivation layer P1.

For example, the first passivation layer P1 may comprise a transparent and light-transmittable material such as an epoxy resin and, thus, the first optical signal R1 may sufficiently pass outward through the first passivation layer P1 and the second optical signal R2 may sufficiently pass inward through the first passivation layer P1.

Particularly, an interface-preventing unit 172 may be interposed between the first transfer package TP1 and the second receiving package RP2 and, thus, the first optical signal R1 may be prevented from passing into the second receiving device 800 from the first light emitting device 200 and the second optical signal R2 may be prevented from passing into the first receiving device 300 from the second light emitting device 700.

For example, the interface-preventing unit 172 may include a gap space between the first transfer package TP1 and the second receiving package RP1 and the gap space may be filled up with air. Thus, the first optical signal R1 may be refracted toward the first transfer package TP1 not toward the second receiving package RP2 due to the difference of the refraction indexes between the first passivation layer P1 and the air, thereby preventing the first optical signal R1 from passing toward the second receiving device 800 in the first connector assembly CA1.

In detail, when the first optical signal R1 may pass outward from the first light emitting device 200 at a slant angle with respect to a surface of the first passivation layer P1, some of the slant optical signal R19 may be refracted from a boundary surface of the first passivation layer P1 into the passivation layer P1. However, the slant optical signal R19 may be re-refracted from a boundary surface of the interface-preventing unit 172 away from the second receiving device 800 due to the medium change from the resin to air, thereby preventing the slant optical signal R19 from passing toward the second receiving device 800.

While the present example embodiment discloses the interface-preventing unit 172 as being filled up with air, the interface-preventing unit 172 may be filled up with various other materials according to the material of the first passivation layer P1 and the size and shape of the interface-preventing unit 172. The filling-up material may be varied according to a relative refraction index between the first passivation layer P1 and the filling up material.

Further, while the present example embodiment discloses that the interface-preventing unit 172 may be shaped into a recess on the first passivation layer P1 between the first transfer package TP1 and the second receiving package RP2, various shapes could also be adopted for the interface-preventing unit 172 on condition that the first optical signal R1 may be sufficiently prevented from passing into the second receiving device 800.

For example, as illustrated in FIG. 4D, the first transfer package TP1 and the second receiving package RP2 may be individually covered with a pair of separated passivation layers P11 and P12 and the first PCB B1 between the first transfer package TP1 and the second receiving package RP2 may be exposed through a gap space of the separated passivation layers P11 and P12. A spacer 182 may be provided on a sidewall of the separated passivation layers P11 and P12 for preventing the first optical R1 from passing into the second receiving device 800.

According to the present example embodiment, the optical connector 1000 may be interposed between a pair of the data sources and transfer the data in the data sources via the optical signals in a one-way or a two-way communication process without any light transfer units. Thus, large-size data may be transferred with high speed and high reliability without the light transfer units. The above optical connector may be widely used in various systems that require the transfer of large-size data, such as multimedia data.

Stack Module Having the Optical Connector

Figure 5A:
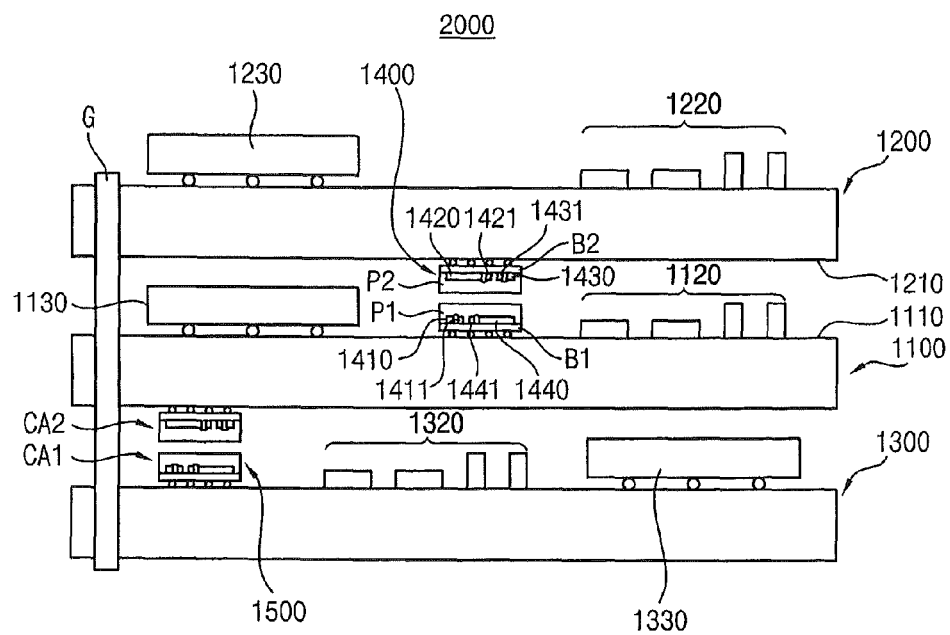
FIGS. 5A and 5B are cross-sectional views illustrating stack modules having the optical connector in accordance with an example embodiment of the present inventive concept.
Figure 5B:
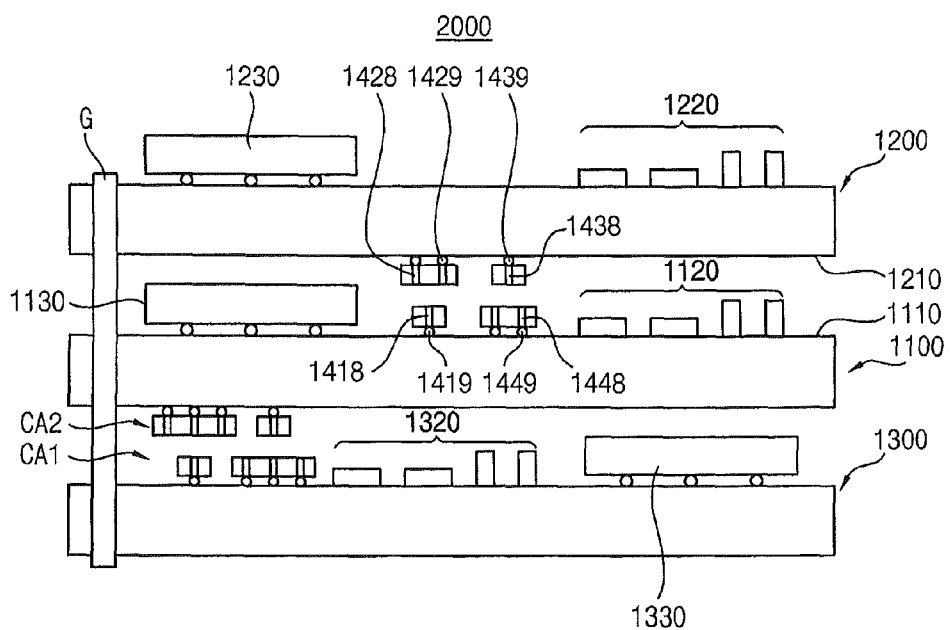

FIGS. 5A and 5B are cross-sectional views illustrating stack modules having the optical connector in accordance with an example embodiment of the present inventive concept. FIG. 5A is a cross-sectional view illustrating an optical connector 1400 that may be connected to the first and the second component modules using a circuit board and FIG. 5B is a cross-sectional view illustrating the optical connector 1400 that may be connected to the first and the second component modules using a penetration electrode.

Referring to FIGS. 5A and 5B, the stack module 2000 in accordance with an example embodiment of the present inventive concept may include first and second component modules 1100 and 1200 spaced apart from each other and having a plurality of conductive structures 1120 and 1220 and an optical connector 1400 interposed between the first and the second component modules 1100 and 1200 and performing one-way data communication or two-way data communication. The conductive structure 1120 and 1220 may include integrated circuit structures, such as integrated circuit (IC) chips.

For example, the first and the second component modules 1100 and 1200 may include IC chips and/or semiconductor packages for processing the data. The first and the second component module 1100 and 1200 may include a single operational module in which a plurality of memory chips and logic circuit chips may be stacked on each other by a chip unit to thereby package into a chip scale package. Otherwise, the first and the second component module 1100 and 1200 may include a unit operational module in which a plurality of memory chips and logic circuit chips may be stacked on a single mother board.

For example, the first and the second component module 1100 and 1200 may include a display module for displaying various processed data, a memory module including a plurality of flash memory devices and DRAM devices and storing the data and a process module for processing the data.

The optical connector 1400 may include a one-way optical connector 500 described in detail with reference to FIG. 1 and a two-way optical connector 1000 described in detail with reference to FIG. 3 according to the functions and characteristics of the first and the second component modules 1100 and 1200.

For example, the optical connector 1400 may include a first light emitting device 1410 on a contact face 1110 of the first component module 1100 and a first light receiving device 1420 on a corresponding face 1210 of the second component module 1200 in such a configuration that the first light emitting device 1410 may generate a first optical signal according to a first input signal of the first component module 1100 and the first optical signal may directly reach the first light receiving device 1420 without a light transfer unit. Therefore, the optical connector 1400 may transfer data from the first component module 1100 to the second component module 1200 with high speed.

In addition, the optical connector 1400 further includes a second light emitting device 1430 on the corresponding face 1210 of the second component module 1200 and a second light receiving device 1440 on the contact face 1110 of the first component module 1100 in such a configuration that the second light emitting device 1430 may generate a second optical signal according to a second input signal of the second component module 1200 and the second optical signal may directly reach the second light receiving device 1440 without a light transfer unit. Therefore, the optical connector 1400 may transfer data from the second component module 1200 to the first component module 1100 with high speed. Accordingly, the optical connector 1400 may perform a two-way data transfer between the first and the second component modules 1100 and 1200.

The optical connector 1400 may be mounted on a circuit board and the circuit board may be connected to both of the first and the second component modules 1100 and 1200. Otherwise, the optical connector 1400 may be directly connected to both of the component modules 1100 and 1200 via the penetration electrodes.

As illustrated in FIG. 5A, the optical connector 1400 may include a first input device 1411 connected to the first light emitting device 1410 by a first bonding wire and to which a first input signal may be applied, and may further include a second output device 1441 connected to the second light receiving device 1440 by a fourth bonding wire and from which a second output signal may be generated. In such a case, the first light emitting device 1410, the first input device 1411, the second light receiving device 1440 and the second output device 1441 may be mounted on the first printed circuit board B1 that may be connected to the first component module 1100.

Further, the optical connector 1400 may include a first output device 1421 connected to the first light receiving device 1420 by a second bonding wire and from which a first output signal may be generated, and may further include a second input device 1431 connected to the second light emitting device 1430 by a third bonding wire and to which a second input signal may be applied. In such a case, the first light receiving device 1420, the first output device 1421, the second light emitting device 1430, and the second input device 1431 may be mounted on the second printed circuit board B2 that may be connected to the second component module 1200.

In such a case, the first light emitting device 1410 and the first light receiving device 1420 may be positioned to closely face each other and, thus, the first optical signal may be transferred to the first light receiving device 1420 from the first light emitting device 1410 without substantial intensity loss. The second light emitting device 1430 and the second light receiving device 1440 may be positioned to closely face each other and, thus, the second optical signal may be transferred to the second light receiving device 1440 from the second light emitting device 1430 without substantial intensity loss. Accordingly, data may be transferred by the optical signals without any light transfer units between the first and the second component modules 1100 and 1200.

Particularly, because the optical connector 1400 may transfer the data along two ways between the first and the second component modules 1100 and 1200 using the first and the second optical signals, real-time interactive data communication may be performed between the first and the second component modules 1100 and 1200.

The optical connector 1400 may be directly connected to the first and the second component modules 1100 and 1200, respectively, by using a respective penetration electrode, thereby reducing the occupancy space of the optical connector 1400 in the stack module 2000.

As illustrated in FIG. 5B, the first light emitting device 1410 may make direct contact with the first component module 1100 through the first transfer penetration electrode 1418 and the first transfer solder balls 1419, and the first light receiving device 1420 may be positioned to closely face the first light emitting device 1410 and may make direct contact with the second component module 1200 through the first receiving penetration electrode 1428 and the first receiving solder balls 1429. In the same way, the second light emitting device 1430 may make direct contact with the second component module 1200 through the second transfer penetration electrode 1438 and the second transfer solder balls 1439, and the second light receiving device 1440 may be positioned to closely face the second light emitting device 1430 and may make direct contact with the first component module 1100 through the second receiving penetration electrode 1448 and the second receiving solder balls 1449.

Accordingly, the first and the second printed circuit boards B1 and B2 may not be needed in the optical connector 1400, thereby reducing the occupancy space of the optical connector 1400 between the first and the second component modules 1100 and 1200. Thus, no matter how small the gap space between the first and the second component modules 1100 and 1200, the optical connector 1400 may be provided between the first and the second component modules 1100 and 1200.

According to the stack module 2000, the light emitting device and the light receiving device may be positioned close to each other in such a way that the light emitting device and the light receiving device may face each other between the first and the second component modules 1100 and 1200, and, thus, the large-size data may be transferred in two ways between the first and the second component modules 1100 and 1200 with high speed and high reliability without any additional light transfer units, such as an optical cable and a reflector. Particularly, because no light transfer unit may be needed for the optical connector 1400, the occupancy space of the optical connector 1400 may be remarkably reduced and, thus, the optical connector 1400 may be easily provided between the first and the second component modules 1100 and 1200 no matter how small the gap space between the first and the second component modules 1100 and 1200 may be. Therefore, the size of the stack module 2000 may be sufficiently reduced without deterioration of the data transfer quality between the first and the second component modules 1100 and 1200.

Various additional component modules may be added to the stack module 2000 in accordance with the requirements of the electronic system including the stack module 2000. For example, a third component module 1300 may be installed under the first component module 1100 and an additional optical connector 1500 may be provided between the first and the third component module 1100 and 1300 in the stack module 2000. In such a case, the real-time interactive data communication may be performed through the optical connectors 1400 and 1500 between the first, the second, and the third component modules 1100, 1200 and 1300. The stack module 2000 including the first to third component modules 1100 to 1300 may function as a single module in one body.

Particularly, as the number of the component modules may increase in the stack module 2000, the occupancy space for the optical connectors may rapidly decrease. In view of recent technical trends in electronic systems in that the size of the electronic systems is continuously decreased and data may be transferred with higher speed and higher reliability, the stack module 2000 including the optical connectors 1400 and 1500 may be adopted to a small-sized electronic system requiring high data transfer speed.

While the present example embodiment discloses that the component modules may be arranged in a vertical direction in the stack module, the component modules may be arranged in any other directions in the stack module when a gap space for providing the optical connector is available between at least a pair of the component modules.

The stack module 2000 may function as at least an operational module in the electronic system.

In an example, the stack module 2000 may function as the operational module for a smart phone in which the first component module 1100 may function as an application process (AP) module, the second component module 1200 may function as a display module, and the third component module 1300 may function as a memory module. The optical connectors 1400 and 1500 may perform the real-time interactive data communication between the AP module, the display module, and the memory module.

The display module 1200 may include various display devices for displaying the data processed by the AP module 1100, such as an LCD module, an OLED module and a print module.

The memory module 1300 may include buffer memory devices and supplementary memory devices. Temporary data for processing data in the AP module 1100 may be temporarily stored in the buffer memory devices and the processed data may be stored in the supplementary memory devices. For example, the buffer memory device may include a read-onlymemory (ROM) and the supplementary memory device may include a flash memory device.

The AP module 1100 may be electrically connected to the display module 1200 and the memory module 1300. The AP module 1100 may process the data transferred from the memory module 1300 and may transfer the processed data to the display module 1200 and/or the memory module 1300.

The AP module 1100, the display module 1200, and the memory module 1300 may be commonly connected to a common ground electrode G, and, thus, the occupancy space for the ground electrode G may be reduced in the smart phone.

The optical connectors 1400 and 1500 may be interposed between the AP module 1100 and the display module 1200 and between the AP module 1100 and the memory module 1300, and may transfer data by using optical signals without additional light transfer units with high speed and high reliability. Thus, the operation speed and reliability of the smart phone including the stack module 2000 may be improved while the size of the smart phone may be sufficiently reduced due to the reduction of the occupancy space of the optical connectors.

In another example, the stack module 2000 may function as the operational module for a computer system in which the first component module 1100 may function as a central process unit (CPU) module, the second component module 1200 may function as a graphic process unit (GPU) module, and the third component module 1300 may function as a memory module. The optical connectors 1400 and 1500 may perform real-time interactive data communication between the CPU module, the GPU module, and the memory module.

Particularly, each of the CPU module 1100, the GPU module 1200, and the memory module 1300 may include a PCB on which a driving chip 1130, 1230, or 1330 and a circuit device 1120, 1230, or 1330 are included. The optical connectors 1400 and 1500 may be connected to the PCBs via external terminals such as solder balls. The CPU module 1100 and the GPU module 1200 may be commonly connected to a single ground electrode G, thereby reducing the occupancy space of the ground electrode G in the computer system including the stack module 2000.

Therefore, data communication between the operation modules of the computer system may be performed by using optical signals in place of electronic signals via the metal wirings, thereby increasing the data transfer speed. In addition, the occupancy space of the optical connectors between the operation modules may be sufficiently reduced to thereby decrease the size of the computer system.

The above example embodiments of the optical connectors 500 and 1000 and the stack module 2000 may also be used for transferring data between electronic systems as well as between internal operation modules in a single electronic system. Hereinafter, a two-way data transfer between electronic systems by using the optical connectors shown in FIG. 3 will be intensively described. However, a one-way data transfer from an electronic system to another electronic system by using the optical connectors shown in FIG. 1 could be performed in the same way as described hereinafter.

Application of the Optical Connector I

Figure 6:
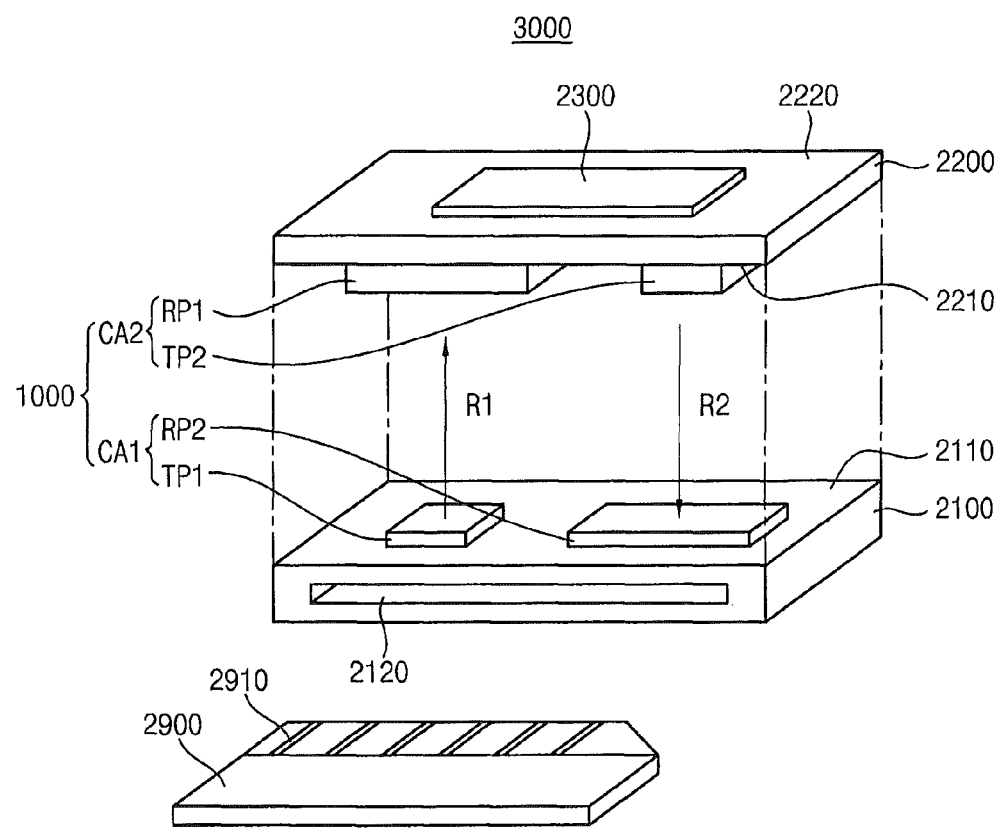
FIG. 6 is a structural view illustrating a memory slot including the optical connector for an electronic system in accordance with an example embodiment of the present inventive concept.

FIG. 6 is a structural view illustrating a memory slot including the optical connector of FIG. 3 for an electronic system in accordance with an example embodiment of the present inventive concept.

Referring to FIG. 6, the memory slot 3000 may include a first body 2100 having an insertion hole 2120 into which an external memory device 2900 may be inserted and a first connection assembly CA1 on a top surface 2110 thereof and a second body 2200 having a second connection assembly CA2 on bottom surface 2210 facing the top surface 2110 of the first body 2100. The first connection assembly CA1 may include a first transfer package TP1 and a second receiving package RP2 and the second connection assembly CA2 may include a first receiving package RP1 and a second transfer package TP2. The first connection assembly CA1 on the top surface 2110 and the second connection assembly CA2 on the bottom surface 2210 may be arranged in such a configuration that the first transfer package TP1 may face the first receiving package RP1 and the second transfer package TP2 may face the second receiving package RP2. The first connection assembly CA1 and the second connection assembly CA2 may be configured into the optical connector 1000 that is described in detail with reference to FIG. 3.

In the above memory slot 3000, the first data source S1 of the optical connector 1000 in FIG. 3 may function as the first body 2100 and second data source S2 of the optical connector 1000 in FIG. 3 may function as the second body 2200, and, thus, the memory slot 3000 may function as a data interface of the electronic system in which the data may be transferred from or into the external memory device 2900 by using the optical signals.

The first body 2100 may generate the first input signal from the external memory device 2900 that may be inserted into the insertion hole 2120. For example, the digital data in the external memory device 2900 may be detected through a metal wiring 2910 of the external memory device 2900. The first input signal may be transformed into the first optical signal R1 by the first transfer package TP1 and the first receiving package RP1 may generate the first output signal corresponding to the first optical signal. The first output signal may be transferred to a related operation module 2300 that may be positioned on a top surface of the second body 2200 or in the electronic system including the memory slot 3000. The data processed by the related operation module 2300 may be transformed into the second optical signal by the second transfer package TP2 and may be transferred to the second receiving package RP2. The second receiving package RP2 may generate the second output signal corresponding to the second optical signal and the second output signal may be transferred to the external memory device 2900. That is, the processed data may be stored in the external memory device 2900.

Accordingly, data communication between the external memory device 2900 and the related operation module of the electronic system may be performed by using optical signals in place of electronic signals via the metal wirings, thereby increasing the data transfer speed. In addition, the occupancy space of the optical connectors in the memory slot 3000 may be sufficiently reduced to thereby decrease the size of the electronic system including the memory slot 3000.

The memory slot 3000 may be applied to various electronic systems as the data interface unit. The electronic system may include a digital video camera, a digital camera, a computer system, such a desktop computer and a laptop computer, a server system, and a mobile system, such as a smart phone and a tablet PC. Thus, large-size data may be transferred between the electronic system and the external memory device through the data interface of the memory slot 3000.

In a modification of the memory slot 3000, the first connection assembly CA1 may be positioned on the external memory device 2900 in place of the top surface of the first body 2100. In such a case, the second connection assembly CA2 may be secured into the electronic system and the first body 2100 may function as an alignment unit for aligning the external memory device 2900 with respect to the second connection assembly CA2. That is, the external memory device 2900 may be inserted into the insertion hole 2120 and may be aligned with the second connection assembly CA2 by the first body 2100 in such a configuration that the first transfer package TP1 may face the first receiving transfer package RP1 and the second transfer package TP2 may face the second receiving package RP2. Thus, optical data communication may be performed between the external memory device 2900 and the electronic system having the second connection assembly CA2 corresponding to the first connection assembly CA1 of the external memory device 2900 without any light transfer units.

Application of the Optical Connector II

Figure 7:
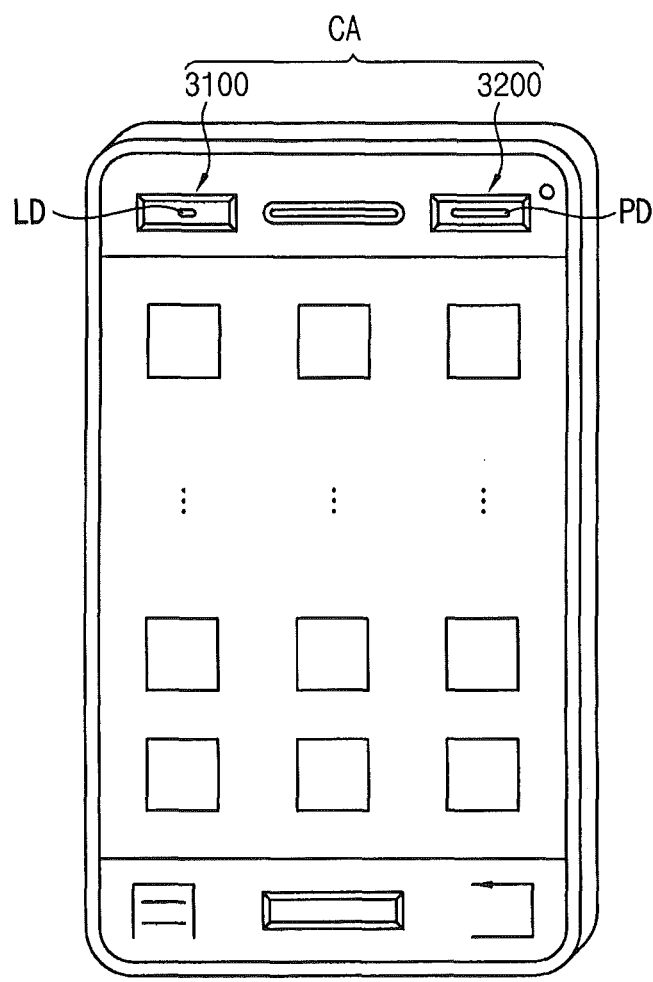
FIG. 7 is a perspective view illustrating an electronic system having a data interface including the optical connector in accordance with an example embodiment of the present inventive concept.
Figure 8:
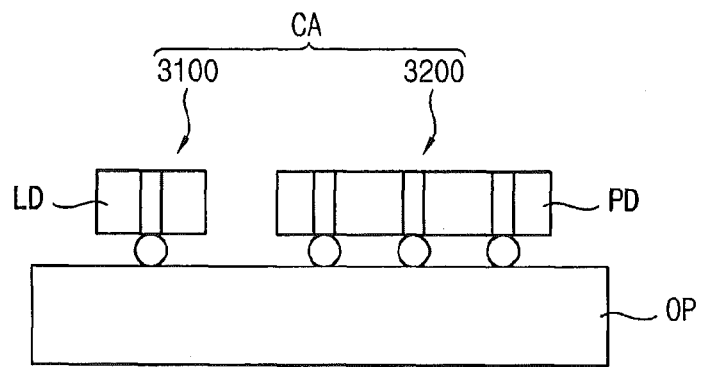
FIG. 8 is a structural view illustrating the data interface shown in FIG. 7.

FIG. 7 is a perspective view illustrating an electronic system having a data interface including the optical connector of FIG. 1 or 3 in accordance with an example embodiment of the present inventive concept. FIG. 8 is a structural view illustrating the data interface shown in FIG. 7.

Referring to FIGS. 7 and 8, the electronic system 4000 having the data interface may include a signal transfer 3100 and a signal receiver 3200.

For example, the signal transfer 3100 and the signal receiver 3200 may have substantially the same structure as the first transfer package TP1 and the second receiving package RP2 of the optical connector 1000 shown in FIG. 3, respectively. That is, the signal transfer 3100 and the signal receiver 3200 may function as the first connection assembly CA1 of the optical connector 1000. For that reason, the pair of the signal transfer 3100 and the signal receiver 3200 may be referred to as a connection assembly CA of the electronic system 4000.

Particularly, the signal transfer 3100 corresponding to the first transfer package TP1 may be positioned at an upper left portion of the electronic system 4000 and the signal receiver 3200 corresponding to the second receiving package RP2 may be positioned at an upper right portion of the electronic system 4000. In such a case, the light emitting device of the signal transfer 3100 and the light receiving device of the signal receiver 3200 may be exposed through the upper surface of the electronic system 4000. In the present example embodiment, the light emitting device and the light receiving device may make direct contact with an internal operation module OP of the electronic system 4000 via the penetration electrodes and solder balls. However, an additional circuit board may also be used for electrical connection between the light emitting device and the light receiving device and the internal module of the electronic system 4000. The internal operation module OP of the electronic system 4000 may include various operation modules for performing a unit operation for driving the electronic system 4000, such as a display module, a memory module, and a central process module.

The electronic system 4000 may be aligned with another electronic system in such a configuration that the signal transfer 3100 of the electronic system 4000 may face the signal receiver of another electronic system and the signal receiver 3200 of the electronic system 4000 may face the signal transfer of another electronic system, thereby performing interactive optical data communication between a pair of the electronic systems 4000.

Figure 9:
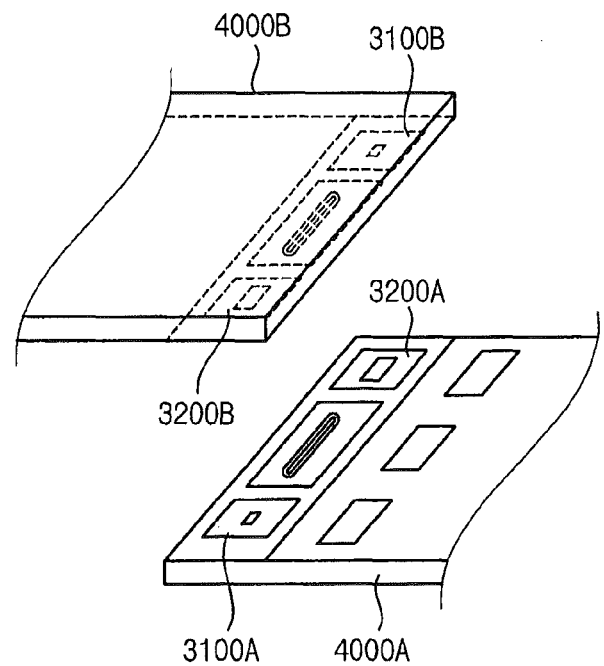
FIG. 9 is a structural view illustrating a pair of the electronic systems shown in FIG. 7 for interactive optical data communication.

FIG. 9 is a structural view illustrating a pair of the electronic systems shown in FIG. 7 for interactive optical data communication.

Referring to FIG. 9, first and second electronic systems 4000A and 4000B including the connection assembly CA may be aligned with each other in such a configuration that the signal transfer 3100 and the signal receiver 3200 of the first electronic system 4000A may face the signal receiver 3200 and the signal transfer 3100 of the second electronic system 4000B, respectively.

Thus, the connection assembly CA of the first electronic system 4000A may function as the first connection assembly CA1 of the optical connector 1000 in FIG. 3 and the connection assembly CA of the second electronic system 4000B may function as the second connection assembly CA2 of the optical connector 1000 in FIG. 3.

When a data transfer mode is activated in the first electronic system 4000A, the data in the first electronic system 4000A may be transformed into the first optical signal by the signal transfer 3100A of the first electronic system 4000A (hereinafter, first signal transfer) and the first optical signal may directly reach the signal receiver 3200B of the second electronic system 4000B (hereinafter, second signal receiver) without any light transfer units. Then, the first optical signal may be transformed into the first output signal by the second signal receiver 3200B and the first output signal may be transferred into the second electronic system 4000B. Thus, the data in the first electronic system 4000A may be transferred to the second electronic system 4000B by using the first optical signal. In the same way, when a data transfer mode is activated in the second electronic system 4000B, the data in the second electronic system 4000B may be transformed into the second optical signal by the signal transfer 3100B of the second electronic system 4000B (hereinafter, second signal transfer) and the second optical signal may directly reach the signal receiver 3200A of the first electronic system 4000A (hereinafter, first signal receiver) without any light transfer units. Then, the second optical signal may be transformed into the second output signal by the first signal receiver 3200A and the second output signal may be transferred into the first electronic system 4000A. Thus, the data in the second electronic system 4000B may be transferred to the first electronic system 4000A by using the second optical signal.

A pair of the electronic systems 4000A and 4000B may be aligned with each other in such a configuration that the first signal transfer 3100A may face the second signal receiver 3200B and the second signal transfer receiver 3100B may face the first signal receiver 3200A, to thereby form the optical connector 1000 by using a pair of the electronic systems 4000A and 4000B. Accordingly, interactive optical data communication may be performed between the first and the second electronic systems 4000A and 4000B by the optical connector in which the first and the second optical signals may be transferred without any light transfer units.

While the above example embodiments discloses that the optical connector shown in FIG. 1 or FIG. 3 may be provided as a supplemental component for data communication between operation modules for a product, the optical connector could also be manufactured into an individual product for transferring data between various storing members.

Application of the Optical Connector III

Figure 10:
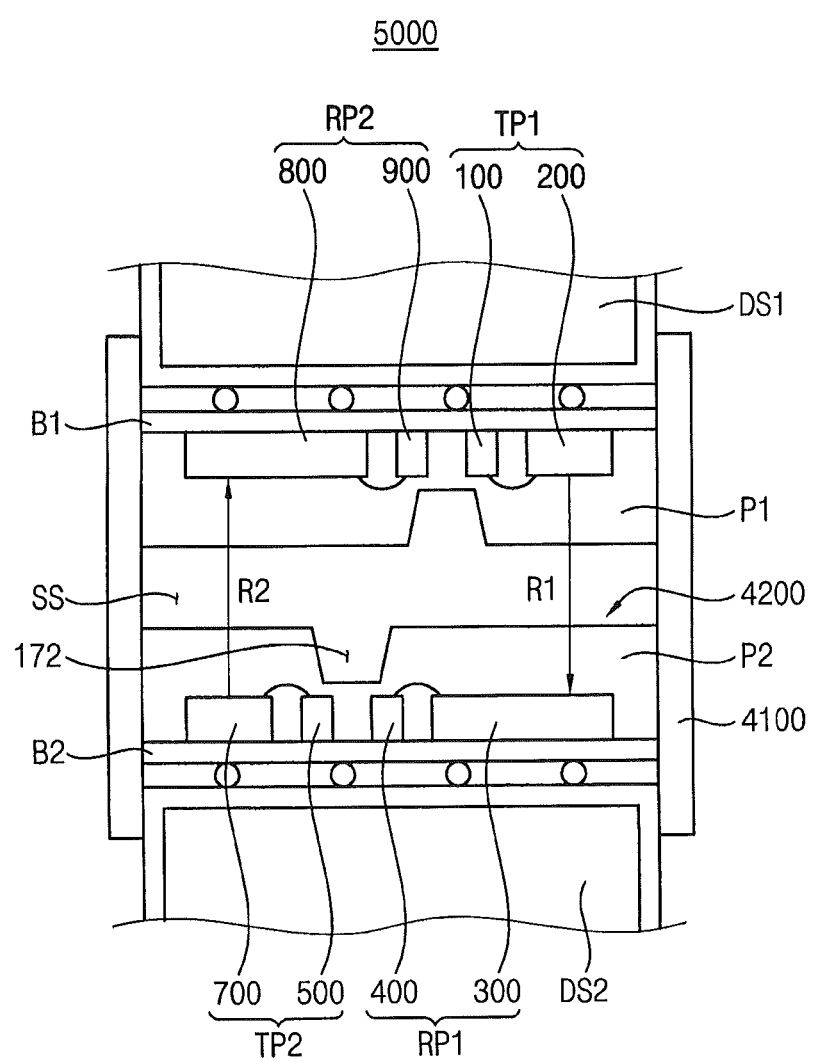
FIG. 10 is a structural view illustrating a first data transfer socket having the optical connector in accordance with an example embodiment of the present inventive concept.

FIG. 10 is a structural view illustrating a first data transfer socket having the optical connector of FIG. 1 or 3 in accordance with an example embodiment of the present inventive concept.

Referring to FIG. 10, the first data transfer socket 5000 may include a socket body 4100 having a socket space SS in which first and second data storing members DS1 and DS2 may be inserted and an optical connector 4200 secured to an inside of the socket body 4100 and electrically connected to the first and second data storing members DS1 and DS2. The interactive optical data communication may be performed between the first and the second data storing members DS1 and DS2 through the optical connector 4200.

For example, the socket space SS may be provided in the socket body 4100 and may be defined by the socket body 4100. Thus, the first and second data storing members DS1 and DS2 may be inserted into the socket space SS. The optical connector 4200 may be installed to an inner wall of the socket space SS to traverse the socket space SS, and, thus, the socket space SS may be separated into a first space in which the first data storing members DS1 may be positioned and a second space in which the second data storing members DS2 may be positioned.

The socket body 4100 may have a rigidity sufficient for maintaining the shape of the socket space SS and securing the first and second data storing members DS1 and DS2 to the socket body 4100. Further, the socket space SS may be shaped into various shapes, such as a slot, an opening and a recess according to the shape of the first and second data storing members DS1 and DS2.

For example, the optical connector 4200 may include a one-way connector 500 as shown in FIG. 1 or a two-way connector 1000 as shown in FIG. 3 according to usage surroundings and requirements of the optical connector 4200. In the present example embodiment, the optical connector 4200 may include the optical connector shown in FIG. 3 performing the two-way data optical communication, and thus each of the transfer packages in the optical connector 4200 may have the same structures as the optical connector 1000 shown in FIG. 3.

Particularly, the optical connector 4200 may include a first transfer package TP1 for generating a first optical signal R1 corresponding to a first input signal of the first data storing member DS1, a first receiving package RP1 receiving the first optical signal R1 and transferring a first output signal corresponding to the first optical signal R1 to the second data storing member DS2, a second transfer package TP2 for generating a second optical signal R2 corresponding to a second input signal of the second data storing member DS2, and a second receiving package RP2 receiving the second optical signal R2 and transferring a second output signal corresponding to the second optical signal R2 to the first data storing member DS1.

The first transfer packages TP1 and the second receiving package RP2 may be mounted on a first circuit board B1 that may be secured to the socket body 4100 in the socket space SS. In the same way, the first receiving packages RP1 and the second transfer package RP1 may be mounted on a second circuit board B2 that may be secured to the socket body 4100 and face the first circuit board B1 in the socket space SS. Thus, the first transfer package TP1 may face the first receiving package RP1 and the second transfer package TP2 may face the second receiving package RP2 in the optical connector 4200. The first passivation layer P1 may be formed on the first circuit board B1 to cover the first transfer package TP1 and the second receiving package RP1, and, thus, the first transfer package TP1 and the second receiving package RP1 may be protected from surroundings by the first passivation layer P1. The second passivation layer P2 may be formed on the second circuit board B2 to cover the first receiving package RP1 and the second transfer package TP1, and, thus, the first receiving package RP1 and the second transfer package TP1 may be protected from surroundings by the second passivation layer P2.

The first and the second data storing members DS1 and DS2 may be electrically connected to the first and the second circuit boards B1 and B2, respectively, in the socket space SS. Thus, the digital data in the first data storing member DS1 may be transformed into the first optical signal R1 and may be transferred to the second data storing member D2 in which the first optical signal R1 may be again transformed into the same digital data. The digital data in the second data storing member DS2 may be transformed into the second optical signal R2 and may be transferred to the first data storing member D1 in which the second optical signal R2 may be again transformed into the same digital data.

The first and the second data storing members DS1 and DS2 may include various data storing devices for electronic systems. For example, the first and the second data storing members DS1 and DS2 may include a hard disk memory device for a computer system, a flash memory device for a digital video camera, a digital camera, and a mobile system, such as a smart phone, and a tablet PC and a large-volume storage device for a server system.

When the first and the second data storing members DS1 and DS2 are inserted into the first and second spaces of the socket space SS, respectively, and a data transfer signal is applied to the first data transfer socket 5000, the digital data in the first and the second data storing members DS1 and DS2 may be transferred through the optical connector 4200 by using the optical signals, thereby performing the two-way optical data communication between the members DS1 and DS2 with high speed and high reliability. Particularly, no additional light transfer units for transferring the first and the second optical signals R1 and R2 may be needed for the optical connector 4200, and, thus, the occupancy space for the optical connector 4200 may be sufficiently reduced in the first data transfer socket 5000.

Figure 11:
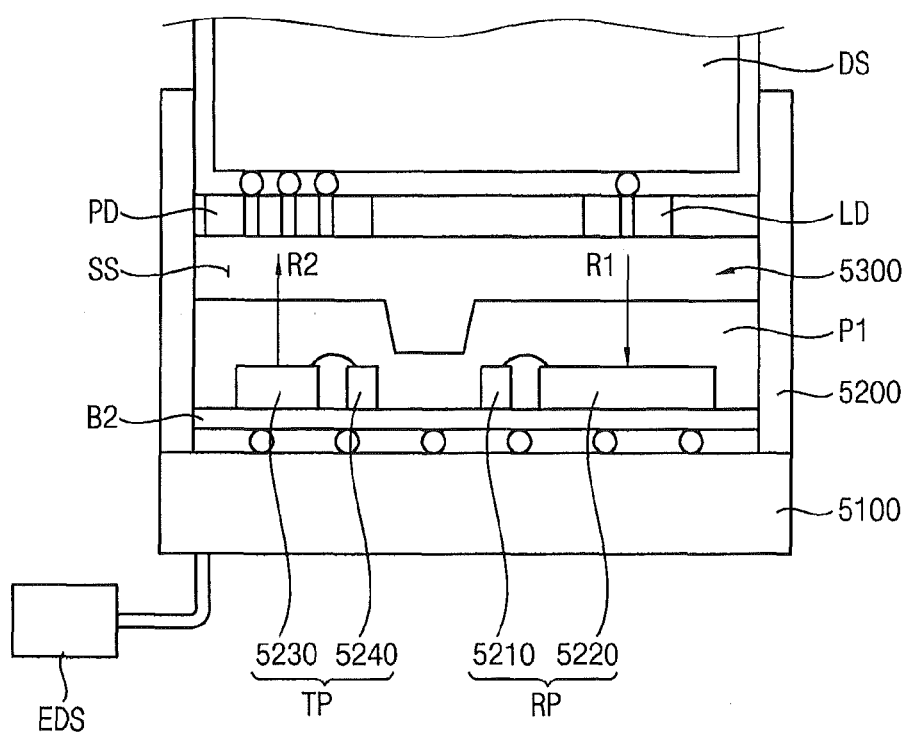
FIG. 11 is a structural view illustrating a second data transfer socket having the optical connector in accordance with an example embodiment of the present inventive concept.

FIG. 11 is a structural view illustrating a second data transfer socket having the optical connector of FIG. 1 or 3 in accordance with an example embodiment of the present inventive concept.

Referring to FIG. 11, the second data transfer socket 6000 may include a socket body 5100, a support 5200 positioned along a lateral portion of the socket body 5100 and defining a socket space SS in which a data storing member DS may be inserted, and an optical connector 5300 secured to the socket body 5100 in the socket space SS and connected to the data storing member DS. The data in the data storing member DS may be transferred into or out through the optical connector 5300 by using the optical signal with high speed.

The socket body 5100 may include a circuit board having various contact terminals (not shown) that may be electrically connected to various electrical systems. For example, the contact terminals may make direct contact with an external cable, such as an USB cable and a SATA cable for an external data storage EDS. The optical connector 5300 may be bonded to the socket body 5100 via solder balls.

The support 5200 may be arranged along the lateral portion of the socket body 5100 and may protrude upwards from the socket body 5100, and, thus, the space enclosed by the socket body 5100 and the support 5200 may be defined into the socket space SS to which the data storing member DS may be inserted. For example, the socket space SS may have various shapes, such as a slot, a recess, and an opening according to the shape of the data storing member DS. In addition, the support 5200 may also have various shapes and comprise material as long as the support 5200 may have sufficient rigidity for holding the data storing member DS and for forming the socket space SS together with the socket body 5100.

The optical connector 5300 may include a receiving package RP for receiving a first optical signal R1 from the data storing member DS and generating an output signal corresponding to the first optical signal R1 and a transfer package TP for generating a second optical signal R2 from the external data storage EDS. The first optical signal R1 may be generated corresponding to a first input signal of the data storing member DS and the first output signal may be transferred to the external data storage through the optical connector 5300. Further, the second optical signal R2 may be generated corresponding to a second input signal of the external data storage EDS.

For example, the receiving package RP may include a light receiving device 5210 for receiving the first optical signal R1 and an output device 5220 connected to the light receiving device 5210 by a bonding wire and generating the output signal corresponding to the first optical signal R1. The transfer package TP may include an input device 5230 to which the second input signal may be applied from the external data storage EDS and a light emitting device 5240 connected to the input device 5230 by a bonding wire and generating the second optical signal R2 corresponding to the second input signal. The transfer package TP and the receiving package RP may be mounted on a circuit board B that may be electrically connected to the socket body 5100. A passivation layer P may be provided on the circuit board B to cover the transfer package TP and the receiving package RP, and, thus, the transfer package TP and the receiving package RP may be protected from surroundings by the passivation layer P.

Particularly, the data storing member DS may include a light emitting diode LD facing the receiving package RP of the optical connector 5300 and a photo diode PD facing the transfer package TP of the optical connector 5300. In the present example embodiment, the light emitting diode LD and the photo diode PD may be reversely connected into the data storing member DS by using a penetration electrode and solder balls similar to a flip chip structure.

Therefore, the first optical signal R1 may be emitted from the light emitting diode LD and may directly reach the receiving package RP without any light transfer units. In the same way, the second optical signal R2 may be emitted from the transfer package TP and may directly reach the photo diode PD of the data storing member DS without any light transfer units.

In the present example embodiment, the data storing member DS may be inserted into the socket space SS in such a configuration that the light emitting diode LD may face the receiving package RP and the photo diode PD may face the transfer package TP of the optical connector 5300, and, thus, the two-way optical data communication may be performed between the data storing member DS and the external data storage EDS by the second data transfer socket 6000. Therefore, large-size data may be mutually communicated between the data storing member DS and the external data storage EDS with high speed and high reliability without any light transfer units.

According to the present example embodiments, the optical connector may include a light emitting device and a light receiving device pair that may be positioned close to each other and face each other, to thereby transfer the large-size data by using optical signals without any additional light transfer units. Particularly, the light emitting device and the light receiving device pair may be respectively installed to a data source and a data destination, to thereby perform a two-way data communication. Thus, the occupancy space for the optical connector may be sufficiently reduced in the electronic system because the optical connection may not require the light transfer units, such as the optical cable and the reflector.

Further, the optical connector may be applied to an individual product, such as a data transfer socket, and, thus, the digital data in individual storage devices may be transferred through the optical connector by using optical signals without any additional light transfer units. In addition, the optical connector may also be applied to a connection component between adjacent operational modules of the electronic systems, thereby increasing the data transfer speed between the modules in the electronic system. Further still, the optical connector may be provided as a data interface of the electronic system between the electronic system and an external data storage, thereby increasing the data transfer speed between the electronic system and the external data storage.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An optical connector comprising:
a first input device connected to a first data source and responsive to a first input signal output from the first data source;
a first light emitting device connected to the first input device and generating a first optical signal corresponding to the first input signal;
a first light receiving device positioned close to the first light emitting device in such a configuration that the first optical signal directly reaches the first light receiving device from the first light emitting device, the first light receiving device generating a first output signal corresponding to the first optical signal;
a first output device connected to the first light receiving device and to a second data source to which the first output signal is transferred;
a first circuit board connected to the first data source and to which the first input device and the first light emitting device are mounted; and
a second circuit board connected to the second data source and to which the first output device and the first light receiving device are mounted.

2. The optical connector of claim 1, wherein the first input device is connected to the first light emitting device by a first bonding wire as a first signal transfer package and the first output device is connected to the first light receiving device by a second bonding wire as a first signal receiving package.

3. The optical connector of claim 1, wherein the first light emitting device is stacked on the first input device as a signal transfer stack package and a first light receiving device is stacked on the first output device as a signal receiving stack package while the first input device is bonded to the first circuit board by a first solder ball and the first output device is bonded to the second circuit board by a second solder ball.

4. The optical connector of claim 1, wherein the first light emitting device makes direct contact with the first data source and the first light receiving device makes direct contact with the second data source, such that the first input device is positioned in an inside of the first data source and the first output device is positioned in an inside of the second data source.

5. The optical connector of claim 4, wherein the first light emitting device comprises a transfer penetration electrode penetrating through the first light emitting device and a transfer solder ball bonding the transfer penetration electrode to the first data source and the first light receiving device comprises a receiving penetration electrode penetrating through the first light receiving device and a receiving solder ball bonding the receiving penetration electrode to the second data source.

6. The optical connector of claim 1, further comprising:
 a second input device connected to the second data source and to which a second input signal is applied;
 a second light emitting device connected to the second input device and generating a second optical signal corresponding to the second input signal, the second optical signal traveling in a direction reverse to the first optical signal;
 a second light receiving device positioned close to the second light emitting device in such a configuration that the second optical signal directly reach the second light receiving device from the second light emitting device, the second light receiving device generating a second output signal corresponding to the second optical signal; and
 a second output device connected to the second light receiving device and to the first data source to which the second output signal is transferred.

7. The optical connector of claim 6, further comprising a first circuit board connected to the first data source and to which the first input device and the first light emitting device and the second light receiving device and the second output device are mounted and a second circuit board connected to the second data source and to which the first output device and the first light receiving and the second input device and the second light emitting device are mounted.

8. The optical connector of claim 7, wherein the first input device and the first light emitting device are connected with each other by a first bonding wire as a first signal transfer package, the second light receiving device and the second output device are connected with each other by a second bonding wire as a second signal receiving package, the first output device and the first light receiving device are connected with each other by a third bonding wire as a first signal receiving package and the second light emitting device and the second input device are connected with each other by a fourth bonding wire as a second signal transfer package.

9. The optical connector of claim 6, wherein the first light emitting device and the second light receiving device are directly connected to the first data source through a first transfer penetration electrode and a second receiving penetration electrode, respectively, and the first input device and the second output device are positioned in an inside of the first data source, and
 the first light receiving device and the second light emitting device are directly connected to the second data source through a first receiving penetration electrode and a second transfer penetration electrode, respectively, and the first output device and the second input device are positioned in an inside of the second data source.

10. The optical connector of claim 6, wherein the first and the second light emitting devices further comprise focusing lenses for focusing the first and the second optical signals to the first and the second light receiving devices, respectively.

* * * * *